US011423680B1

(12) United States Patent
Jade et al.

(10) Patent No.: US 11,423,680 B1
(45) Date of Patent: Aug. 23, 2022

(54) LEVERAGING TEXT PROFILES TO SELECT AND CONFIGURE MODELS FOR USE WITH TEXTUAL DATASETS

(71) Applicant: SAS Institute Inc., Cary, NC (US)

(72) Inventors: Teresa S. Jade, Cary, NC (US); Xiao Li, Beijing (CN); Chunqi Zuo, Beijing (CN); Paul Jeffrey Kovach, Raleigh, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 17/565,824

(22) Filed: Dec. 30, 2021

Related U.S. Application Data

(60) Provisional application No. 63/294,514, filed on Dec. 29, 2021, provisional application No. 63/277,764, filed on Nov. 10, 2021.

(51) Int. Cl.
*G06F 16/335* (2019.01)
*G06V 30/19* (2022.01)
*G06F 40/10* (2020.01)

(52) U.S. Cl.
CPC ...... *G06V 30/19113* (2022.01); *G06F 16/335* (2019.01); *G06F 40/10* (2020.01); *G06V 30/19093* (2022.01); *G06V 30/19147* (2022.01)

(58) Field of Classification Search
CPC .......... G06F 16/335; G06F 40/10; G06V 30/19147; G06V 30/19093; G06V 30/19113
See application file for complete search history.

(56) References Cited

U.S. PATENT DOCUMENTS

| 9,292,493 | B2 | 3/2016 | Chandramouli et al. |
| 9,569,729 | B1 | 2/2017 | Oehrle et al. |
| 10,176,251 | B2 | 1/2019 | Boule et al. |
| 10,642,975 | B2 | 5/2020 | Ott et al. |
| 10,949,611 | B2 | 3/2021 | Brake et al. |
| 10,956,461 | B2 | 3/2021 | Franceschini et al. |
| 2012/0254333 | A1 | 10/2012 | Chandramouli et al. |
| 2016/0071022 | A1 | 3/2016 | Bruno et al. |

(Continued)

OTHER PUBLICATIONS

"Measure Lexical Diversity", Text Inspector, 2004, 8 pages.
(Continued)

*Primary Examiner* — Truong V Vo
(74) *Attorney, Agent, or Firm* — Kilpatrick Townsend & Stockton LLP

(57) ABSTRACT

Text profiles can be leveraged to select and configure models according to some examples described herein. In one example, a system can analyze a reference textual dataset and a target textual dataset using text-mining techniques to generate a first text profile and a second text profile, respectively. The first text profile can contain first metrics characterizing the reference textual dataset and the second text profile can contain second metrics characterizing the target textual dataset. The system can determine a similarity value by comparing the first text profile to the second text profile. The system can also receive a user selection of a model that is to be applied to the target textual dataset. The system can then generate an insight relating to an anticipated accuracy of the model on the target textual dataset based on the similarity value. The system can output the insight to the user.

30 Claims, 26 Drawing Sheets

(56) References Cited

U.S. PATENT DOCUMENTS

| | | | |
|---|---|---|---|
| 2018/0150459 A1 | 5/2018 | Farid et al. | |
| 2018/0276291 A1* | 9/2018 | Zhao | G06Q 40/025 |
| 2019/0294633 A1 | 9/2019 | Dembo et al. | |
| 2019/0347563 A1 | 11/2019 | Bruno et al. | |
| 2021/0097405 A1 | 4/2021 | McNeil et al. | |
| 2021/0165969 A1 | 6/2021 | Galitsky | |
| 2021/0256543 A1 | 8/2021 | Bessen et al. | |

OTHER PUBLICATIONS

"Part 1607—Uniform Guidelines on Employee Selection Procedures", Title 29, Secs. 709 and 713, Civil Rights Act of 1964 (78 Stat. 265) as amended by the Equal Employment Opportunity Act of 1972 (Pub. L. 92-261); 42 U.S.C. 2000e-8, 2000e-12, 43 FR 38295, 38312, Oct. 7, 2021, 20 pages.

Asgari et al., "Comparing Fifty Natural Languages and Twelve Genetic Languages Using Word Embedding Language Divergence (WELD) as a Quantitative Measure of Language Distance", Proceedings of the Workshop on Multilingual and Cross-lingual Methods in NLP, Jun. 17, 2016, pp. 65-74.

Babych et al., "Meta-Evaluation of Comparability Metrics Using Parallel Corpora", 12th International Conference on Intelligent Text Processing and Computational Linguistics CICLing, Apr. 2014, 12 pages.

Baisa et al., "Intrinsic Methods for Comparison of Corpora", Proceedings of Recent Advances in Slavonic Natural Language Processing, 2013, pp. 51-58.

Bentz et al., "Variation in Word Frequency Distributions: Definitions, Measures and Implications for a Corpus-Based Language Typology", Journal of Quantitative Linguistics, vol. 24, No. 2-3, Jan. 17, 2017, pp. 128-162.

Butters et al., "Using Similarity Metrics for Terminology Recognition", Proceedings of the Sixth International Conference on Language Resources and Evaluation (LREC'08), May 2008, pp. 2817-2822.

Campos et al., "Measuring Diachronic Language Distance Using Perplexity: Application to English, Portuguese, and Spanish", Natural Language Engineering, vol. 26, No. 4, Jul. 2020, pp. 433-454.

Ciravegna et al., "Understanding Messages in a Diagnostic Domain", Information Processing & Management, vol. 31, No. 5, Sep. 15, 1995, pp. 687-701.

Cook et al., "Building and Evaluating Web Corpora Representing National Varieties of English", Lang Resources & Evaluation, vol. 51, No. 3, Sep. 2017, pp. 643-662.

Dunn , "Representations of Language Varieties Are Reliable Given Corpus Similarity Measures", Proceedings of the 8th VarDial Workshop on NLP for Similar Languages, Varieties and Dialects, Apr. 20, 2021, pp. 28-38.

Fothergill et al., "Evaluating a Topic Modelling Approach to Measuring Corpus Similarity", Proceedings of the Tenth International Conference on Language Resources and Evaluation (LREC'16), May 2016, pp. 273-279.

Frantzi et al., "A Corpus-Based Analysis of the Language Used by Defendants of Homicide in Court", World Journal of Social Science Research, vol. 4, No. 2, Jun. 2017, pp. 164-174.

Gomaa et al., "A Survey of Text Similarity Approaches", International Journal of Computer Applications, vol. 68, No. 13, Apr. 2013, pp. 13-18.

Gries , "Methodological and interdisciplinary stance in Corpus Linguistics", Supplied by the British Library, Oct. 13, 2021, pp. 81-98.

Grishman et al., "Automated Determination of Sublanguage Syntactic Usage", ACL '84/COLING '84: Proceedings of the 10th International Conference on Computational Linguistics and 22nd annual meeting on Association for Computational Linguistics, Jul. 1984, pp. 96-100.

Heylighen et al., "Formality of Language: Definition, Measurement and Behavioral Determinants", Internal Report, Center "Leo Apostel", 1999, 38 pages.

Jade , "SAS Text Analytics for Business Applications Concept Rules for Information Extraction Models", British Library, Nov. 23, 2021, 4 pages.

Jarvis , "Capturing the Diversity in Lexical Diversity", Language Learning, A Journal of Research in Language Studies, vol. 63, Suppl. 1, Mar. 2013, pp. 87-106.

Jurafsky et al., "N-Gram Language Models", Speech and Language Processing, 2021, 29 pages.

Kilgarriff , "Comparing Corpora", International Journal of Corpus Linguistics, vol. 6, No. 1, 2001, pp. 97-133.

Kilgarriff et al., "Extrinsic Corpus Evaluation with a Collocation Dictionary Task", Proceedings of the Ninth International Conference on Language Resources and Evaluation (LREC'14), May 2014, pp. 545-552.

Kilgariff , "Getting to Know Your Corpus", International Conference on Text, Speech and Dialogue, 2012, pp. 3-15.

Kilgarriff et al., "Measures for Corpus Similarity and Homogeneity", Proceedings of the Third Conference on Empirical Methods for Natural Language Processing, Jun. 1998, pp. 46-52.

Kyle et al., "The Tool for the Automatic Analysis of Lexical Sophistication (TAALES)", Behavior Research Methods, Version 2.0, vol. 50, 2018, pp. 1030-1046.

Li et al., "Improving Corpus Comparability for Bilingual Lexicon Extraction from Comparable Corpora", Proceedings of the 23rd International Conference on Computational Linguistics, Aug. 2010, pp. 644-652.

Lin et al., "Divergence Measures Based on the Shannon Entropy", Institute of Electrical and Electronics Engineers Transactions on Information Theory, vol. 37, No. 1, Jan. 1991, pp. 145-151.

Liu et al., "An Improved Corpus Comparison Approach to Domain Specific Term Recognition", 22nd Pacific Asia Conference on Language, Information and Computation, Jan. 2008, pp. 253-261.

Liu et al., "Termhood-Based Comparability Metrics of Comparable Corpus in Special Domain", Lecture Notes in Computer Science vol. 7717, Feb. 19, 2013, pp. 134-144.

Lu et al., "A Topic-Based Approach to Multiple Corpus Comparison", AICS, 2019, 12 pages.

Lu et al., "Diverging Divergences: Examining Variants of Jensen Shannon Divergence for Corpus Comparison Tasks", Proceedings of the 12th Conference on Language Resources and Evaluation, May 11-16, 2020, pp. 6740-6744.

Lu et al., "Extending Jensen Shannon Divergence to Compare Multiple Corpora", AICS, Computer Science, Mathematics, 2017, 12 pages.

Mason , "An N-Gram Based Approach to the Automatic Classification of Web Pages by Genre", Dalhousie University, Dec. 16, 2009, 172 pages.

McDonald , "Natural Language Generation", Handbook of Natural Language Processing, 2000, pp. 147-179 (35 pages).

Nikolova , "Unified Extraction of Health Condition Descriptions", Proceedings of the NAACL HLT 2012 Student Research Workshop, Jun. 2-8, 2012, pp. 23-28.

Och et al., "A Systematic Comparison of Various Statistical Alignment Models", Association for Computational Linguistics, vol. 29, No. 1, Mar. 2003, pp. 19-51.

Piperski , "Corpus Size and the Robustness of Measures of Corpus Distance", HSE University, May 30-Jun. 2, 2018, 11 pages.

Quero , "A Corpus Comparison Approach for Estimating the Vocabulary Load of Medical Textbooks Using the GSL, AWL, and EAP Science Lists", TESOL International Journal, vol. 12, No. 1, 2017, pp. 177-192.

Rayson et al., "Comparing Corpora Using Frequency Profiling", WCC '00: Proceedings of the Workshop on Comparing Corpora, Oct. 7, 2000, pp. 1-6.

Shaikina et al., "Medical Corpora Comparison Using Topic Modeling", 9th International Young Scientist Conference on Computational Science, vol. 178, 2020, pp. 244-253.

Sun et al., "Frequency Distributions of Punctuation Marks in English", English Today, vol. 35, No. 4, Dec. 2019, pp. 23-35.

(56) References Cited

OTHER PUBLICATIONS

Szmrecsanyi et al., "Variation-Based Distance and Similarity Modeling: A Case Study in World Englishes", Frontiers in Artificial Intelligence, vol. 2, Article 23, Nov. 5, 2019, 14 pages.

Temnikova et al., "Closure Properties of Bulgarian Clinical Text", Proceedings of Recent Advances in Natural Language Processing, Sep. 7-13, 2013, pp. 667-675.

Temnikova et al., "Measuring Closure Properties of Patent Sublanguages", Proceedings of Recent Advances in Natural Language Processing, Sep. 7-13, 2013, pp. 659-666.

Temnikova et al., "Recognizing Sublanguages in Scientific Journal Articles through Closure Properties", Proceedings of the Workshop on Biomedical Natural Language Processing, Aug. 4-9, 2013, pp. 72-79.

Van Den Rul, "Basics: Measuring The Linguistic Complexity of Text", Towards Data Science, Nov. 9, 2019, 6 pages.

Mllasenor-Pineda et al., "A Corpus Balancing Method for Language Model Construction", International Conference on Intelligent Text Processing and Computational Linguistics, Computational Linguistics and Intelligent Text Processing, Apr. 30, 2003, pp. 393-401.

Zampieri et al., "Natural Language Processing for Similar Languages, Varieties, and Dialects: A Survey", Natural Language Engineering, vol. 26, No. 6, 2020, pp. 595-612.

\* cited by examiner

| Category 1: | Category 2: | Category 3: | Category 4: | Category 5: | |
|---|---|---|---|---|---|
| (C1, M1) | (C2, M1) | (C3, M1) | (C4, M1) | (C5, M1) | ← 1504 |
| . | . | . | . | . | |
| . | . | . | . | . | |
| . | . | . | . | . | |
| (C1, Mn) | (C2, Mn) | (C3, Mn) | (C4, Mn) | (C5, Mn) | ← 1506 |

FIG. 15 

LEVERAGING TEXT PROFILES TO SELECT AND CONFIGURE MODELS FOR USE WITH TEXTUAL DATASETS

REFERENCE TO RELATED APPLICATIONS

This claims the benefit of priority under 35 U.S.C. § 119(e) to U.S. Provisional Patent Application No. 63/277,764, filed Nov. 10, 2021, and to U.S. Provisional Patent Application No. 63/294,514, filed Dec. 29, 2021, the entirety of each of which is hereby incorporated by reference herein.

TECHNICAL FIELD

The present disclosure relates generally to predicting model performance on a target textual dataset. More specifically, but not by way of limitation, this disclosure relates to leveraging text profiles to select, configure, and test models for use with textual datasets.

BACKGROUND

Textual datasets are commonly analyzed in a variety of industries. Textual datasets may include unstructured text, such as social media posts (e.g., tweets), product reviews, service reviews, books, e-mails, word processing documents, etc. Unstructured text refers to natural language text that includes written human language, such as the free-form text humans type on their keyboards or touch screens. Unstructured text is different from structured data, which is organized in a pre-defined format from which well-defined semantics can be inferred. Unstructured text is now one of the most common types of data generated by humans, and it is growing at an exponential rate.

To derive relevant information from the textual datasets, particularly those with unstructured text, natural language processing (NLP) techniques can be applied. Some NLP techniques may involve models, such as rule-driven models, machine-learning models, or hybrids of the two. The machine-learning models may be trained using training data that contains annotated (i.e., labeled) textual datasets, such as a labeled corpus of documents. During training, the machine-learning models learn patterns found in that training data. As a result, the trained models frequently cannot be reliably or robustly applied to other textual datasets that have significantly different textual characteristics than the training data, such as textual datasets involving different genres, domains, or languages from the ones in the training data. Likewise, rule-driven models are typically configured for use with textual datasets having certain textual characteristics, such as specific domains, genres, or languages. As a result, the rule-driven models often cannot be reliably or robustly applied to textual datasets with significantly different characteristics than the ones for which the rule-driven models are designed.

SUMMARY

One example of the present disclosure includes a system comprising one or more processors and one or more memory devices, the one or more memory devices including instructions that are executable by the one or more processors for causing the one or more processors to: analyze a reference textual dataset by applying a plurality of text-mining techniques to the reference textual dataset to generate a first text profile containing a first plurality of metrics characterizing the reference textual dataset; analyze a target textual dataset by applying the plurality of text-mining techniques to generate a second text profile containing a second plurality of metrics characterizing the target textual dataset; determine a similarity value representing how similar the target textual dataset is to the reference textual dataset by comparing the second text profile to the first text profile, wherein comparing the second text profile to the first text profile involves comparing at least some of the second plurality of metrics to at least some of the first plurality of metrics; receive, through a graphical user interface and from a user, a selection of a model that is to be applied to the target textual dataset; in response to receiving the selection, determine characteristics of the model selected by the user, wherein the characteristics include a type and at least one setting of the model; generate one or more insights relating to an anticipated accuracy of the model on the target textual dataset based on the similarity value and the characteristics of the model; and output the one or more insights to the user in the graphical user interface.

Another example of the present disclosure includes a method comprising analyzing a reference textual dataset by applying a plurality of text-mining techniques to the reference textual dataset to generate a first text profile containing a first plurality of metrics characterizing the reference textual dataset; analyzing a target textual dataset by applying the plurality of text-mining techniques to generate a second text profile containing a second plurality of metrics characterizing the target textual dataset; determining a similarity value representing how similar the target textual dataset is to the reference textual dataset by comparing the second text profile to the first text profile, wherein comparing the second text profile to the first text profile involves comparing at least some of the second plurality of metrics to at least some of the first plurality of metrics; receiving a selection of a model that is to be applied to the target textual dataset, the selection being received through a graphical user interface from a user; in response to receiving the selection, determining characteristics of the model selected by the user, wherein the characteristics include a type and at least one setting of the model; generating one or more insights relating to an anticipated accuracy of the model on the target textual dataset based on the similarity value and the characteristics of the model; and outputting the one or more insights to the user in the graphical user interface.

Yet another example of the present disclosure includes a non-transitory computer-readable medium comprising program code that is executable by one or more processors for causing the one or more processors to: analyze a reference textual dataset by applying a plurality of text-mining techniques to the reference textual dataset to generate a first text profile containing a first plurality of metrics characterizing the reference textual dataset; analyze a target textual dataset by applying the plurality of text-mining techniques to generate a second text profile containing a second plurality of metrics characterizing the target textual dataset; determine a similarity value representing how similar the target textual dataset is to the reference textual dataset by comparing the second text profile to the first text profile, wherein comparing the second text profile to the first text profile involves comparing at least some of the second plurality of metrics to at least some of the first plurality of metrics; receive, through a graphical user interface and from a user, a selection of a model that is to be applied to the target textual dataset; in response to receiving the selection, determine characteristics of the model selected by the user, wherein the characteristics include a type and at least one setting of the model; generate one or more insights relating to an anticipated accuracy of the model on the target textual dataset based on the similarity value and the characteristics of the model, and output the one or more insights to the user in the graphical user interface.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 15 depicts an example of categories of metrics according to some aspects.

Figure 1:
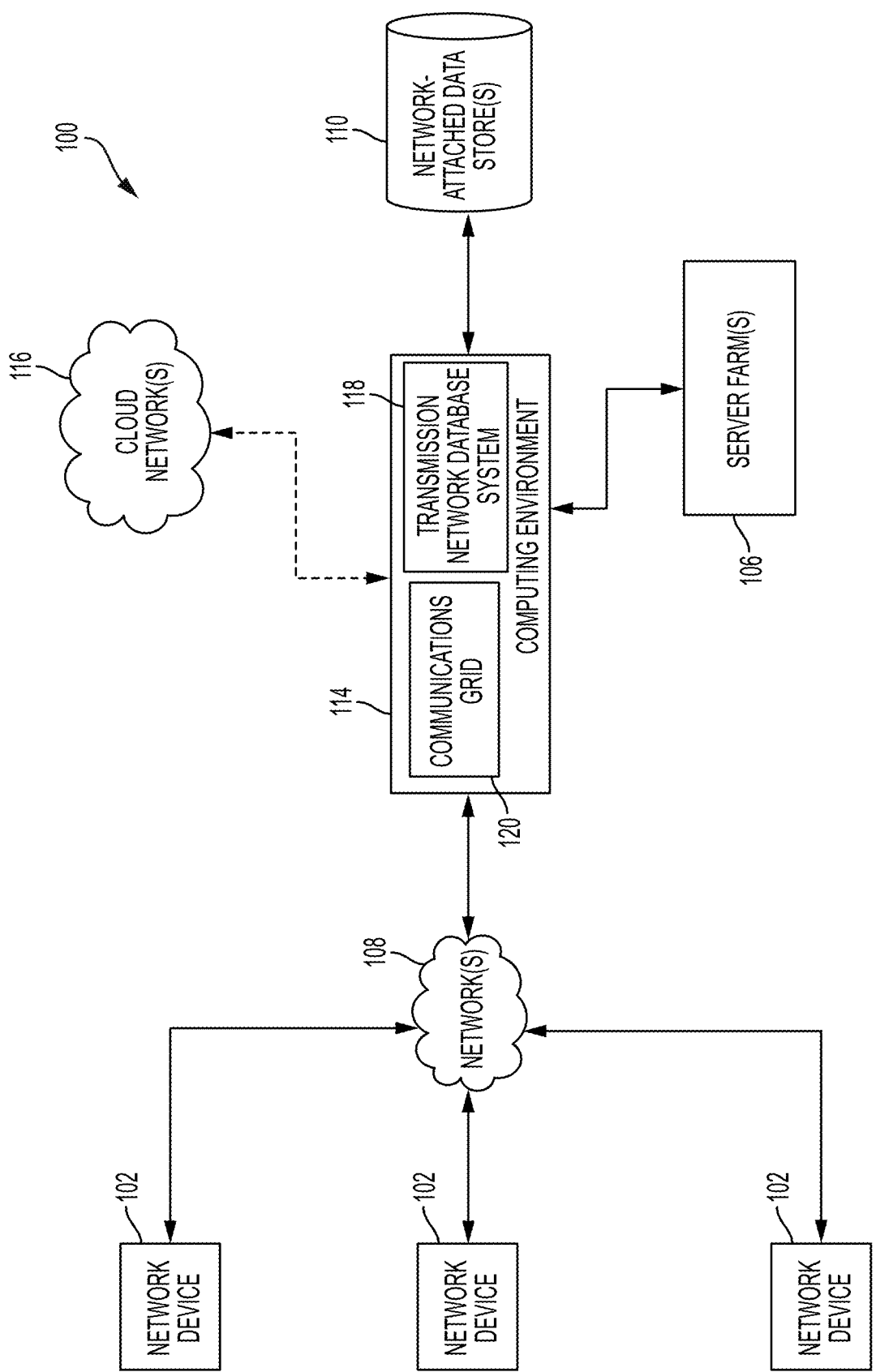
FIG. 1 depicts a block diagram of an example of a computing system according to some aspects.

In the appended figures, similar components or features can have the same reference label. Further, various components of the same type can be distinguished by following the reference label with a lowercase letter that distinguishes among the similar components. If only the first reference label is used in the specification, the description is applicable to any one of the similar components having the same first reference label irrespective of the lowercase letter.

DETAILED DESCRIPTION

Text data used in Text Analytics and other Natural Language Processing (NLP) modeling is vast and varied. The variation of language can be infinite and even the variety of information and variance in form that can comprise a single sentence is virtually impossible to model in any practical way. Therefore, any model that "represents" or "understands" human language is representing only the slice of human language that it has been exposed to or trained on.

Today's NLP models are often built using machine learning or deep learning techniques, although some use rules or explicit patterns and others use a combination of these techniques. The secret of all such models is that they all use patterns, and for "learning" models anything they have not seen before is a weakness in the model. Applying one model trained on a first dataset associated with a first domain on a second dataset associated with a second domain, where the second domain is different from the first domain, is called "out-of-domain" application and usually results in significantly lower accuracy.

These models can be built for a variety of purposes, but some common examples of models include document-level sentiment models, feature (or text-level) sentiment models, document categorization models, information extraction models, part-of-speech tagging models, dependency parsing models, etc. The text data used with these models can vary from domain to domain, and may contain different or similar types of documents. Examples of such documents may include documents produced in a legal action; a set of reviews for a particular product, company, or service; medical notes for a particular specialty area in a hospital; technical notes from mechanics at an auto dealership; survey results from open question in a survey on corporate policies; contracts used in a law firm; design documents from an engineering team; news articles from several news websites; tweets related to an event like a protest in London; blogs from a particular timeframe; posts from a forum devoted to car enthusiasts; etc.

These and other issues make it challenging to help an individual that has a dataset that they wish to process but does not have a model trained on that dataset. Perhaps the data has no annotations, so there is no way to use it as a training set without investing a lot of time or money in adding annotations. It would be desirable to help such an individual understand the following:

The risk that their model will perform worse on the new, out-of-domain data;
How to mitigate the risk of applying a model to the new data; and
How to select a good model type for the data, if they have a choice between models.

Until now, there has been no solution offered to these problems. The existing research focuses instead on comparing sets of terms, generally to compare each term and its likelihood to appear in each dataset or its strength in representing the topics in a data set. A few researchers compare datasets to one another, but not for the purposes described above. Instead, they focus on research goals such as identifying generic vs. domain-specific data sets, categorizing documents in genres, defining good vs. bad writing at the document level, identifying native vs. non-native speaker documents, etc. In other words, the focus is usually on the document or words used in the document and not on comparing datasets to one another to determine the effect on modeling results.

The current state-of-the-art research that is related to the problem of applying models to out-of-domain data focuses on obtaining more and more training data (for models that are not supervised) or on "tuning" models that have been trained on a different dataset by optimizing selection of a sample of data from the new dataset and retraining the model. The challenge with the first approach is the language is infinite, and even if the model is able to be made somewhat robust, the costs are large and there is always data that is not used in training the model, creating gaps in the robustness of applying the model to new data. The challenge with the second approach is that the model must be retrained and that always changes the model, so the new model's results are not comparable with older results on previous datasets. Also, the processing required to retrain or tune the model may be extensive or expensive depending on the type of model being used.

As alluded to above, a model's accuracy can vary significantly between datasets based on how the model was trained and configured as well as the characteristics of the datasets to which the model is applied. For example, linguistic variation can have a significant impact on how well a model designed for one type of textual dataset performs when applied to another type of textual dataset. This is due to the fact that most models are built on key words and the order of words in patterns. As a result, differences in languages and dialects, vocabulary size, vocabulary overlap, grammatical patterns, and other linguistic variations can result in significant accuracy differences when a model is applied to textual datasets with different linguistic characteristics. This could lead to a situation where the model is relatively accurate for one dataset but relatively inaccurate for another. These factors can make it challenging to determine which type of model or model configuration will work best for a target dataset. Additionally, many users may not be aware of this problem and thus may not know that the model they are applying to a given textual dataset is experiencing degraded accuracy due a "mismatch" between the model and the textual dataset. As a result, users may believe that the model is producing accurate results when in fact it is not.

Some examples of the present disclosure can overcome one or more of the above-mentioned problems via a system that can determine how similar a reference textual dataset is to a target textual dataset based on the characteristics of each dataset. In some examples, the textual datasets may include corpora of documents containing unstructured data. Based on the similarities and differences between the two textual datasets, the system can predict whether a model will be suitably accurate when applied to the target textual dataset. If the model will not be suitably accurate when applied to the target textual dataset, the system can determine alternative model types or alternative model settings that may yield more accurate results when applied to the target textual dataset. The system can then output the recommendations to the user in a graphical user interface. This may help the user predict how well their selected model will perform on the target textual dataset and make adjustments to improve modeling results.

The solutions offered in the present disclosure are based on the premise that datasets can be understood by comparing them. If something is known about Dataset A, that knowledge may be readily usable if Dataset B is similar to Dataset A, but may not be readily usable if Dataset B is very different from Dataset A. Some aspects of the present disclosure help to answer the question of whether Dataset A very similar to or very different from Dataset B. This is not something that has been previously done to the same extent (e.g., a detailed and broad comparison of textual datasets) or to solve the same problem (e.g., providing advice to maximize use of the data and related models) in previous research or software. While some other work may compute similar metrics and sometimes even compare corpora, the metrics and comparison results are not then used to generate and provide modeling insights.

The present disclosure can rely on many different aspects of textual datasets in making these comparisons. Some aspects of textual datasets can provide a broader view and deeper understanding of the textual datasets and therefore may create a more complete picture of the datasets. Examples of such aspects can include the following:

Vocabulary Diversity: how varied the vocabulary is in the dataset and how many terms would one need to know to understand the documents.
Information Density: how much information is packed into the documents and how complex the language/terminology is.
Language Formality: how formal the writing style and content is.
Information Complexity: how much information is included in each sentence or clause.
Domain Specificity: how domain specific the data set is, and how specialized or generalized the vocabulary and grammar is.

Some or all of these aspects can be used in the comparative assessment so as to analyze at textual data from different perspectives and capture insights that can be useful for different types of models. For example, if the vocabulary of a target data set is very diverse but the model was built on a less diverse but more domain-specific dataset (source), then the overlap in vocabulary may be very small. In other words, the models that rely on vocabulary overlap will perform poorly on the target data set. While some researchers have looked at multiple datasets from a vocabulary perspective, they do not combine that perspective with other elements to characterize the differences between datasets. In contrast, systems described herein may apply a combination of perspectives and metrics in a unique way to compare datasets.

One particular example of a system of the present disclosure will now be described for illustrative purpose. In this example, the system can generate a graphical user interface through which a user can select a target textual dataset to be analyzed using a model. After receiving the selection of the target textual dataset, the system can analyze a reference textual dataset to determine a first text profile containing a first set of metrics that characterize the reference textual dataset. A text profile includes a set of metrics that characterize the text properties of a textual dataset, where the metrics may be numerical values. The text properties may include the lists and characteristics of words, the way elements in the text are formed (e.g., tokens, sentences, and documents), patterns of sequences or clusters of elements (e.g., n-grams, repetition, and duplication), and grammatical structure or categories (e.g., part-of-speech, syntax, and clause structure). In some cases, the text profile may also include one or more lists of terms (e.g., words or phrases) extracted from the textual dataset, where such lists of terms are different from the sentences of the textual dataset itself. The system can also analyze the target textual dataset to generate a second text profile containing a second set of metrics characterizing the target textual dataset. In some examples, the system can generate the first set of metrics and the second set of metrics using any number and combination of text-mining techniques. The text-mining techniques may analyze information complexity, vocabulary diversity, information density, language formality, domain specificity, and other textual characteristics of the corresponding dataset to which they are applied. In some examples, the text-mining techniques may use natural-language processing techniques to derive the metrics. Having determined the first text profile and the second text profile, the system can then determine a similarity value representing how similar the target textual dataset is to the reference textual dataset. This may involve comparing at least some of the metrics in the first set of metrics to the corresponding metrics in the second set of metrics. The system may output the first set of metrics, the second set of metrics, the similarity score, or any combination of these in the graphical user interface.

The user may also be able to select, through the graphical user interface, a model (e.g., a specific model or a model type) to be used to analyze the target textual dataset. For example, the user may select a model from a drop-down menu or list containing a set of candidate models for selection. Based on the selection, the system can determine characteristics of the selected model. Examples of the characteristics of the selected model can include a type of the model, a value for a setting of the model, or both. The setting may include a hyperparameter, in some examples. The system can then generate one or more insights relating to the anticipated accuracy of the model on the target textual dataset. As used herein, an insight is any useful or potentially useful information about a subject (e.g., topic) of interest that may help provide a deeper understanding of the subject. The system can generate the insights based on the similarity value and the characteristics of the model. The system can then output the one or more insights to the user in the graphical user interface. The insights may allow the user to gain a better understanding of how well the model may perform if it is applied to the target textual dataset. In some examples, the insights may include recommendations about how to improve (e.g., optimize) modeling results. The insights may be output as a sentence of words generated using templates or natural-language generation techniques, so that the insights are more readily understandable to less-technical users that may have less experience or familiarity with modeling.

The reference textual dataset may be used as a baseline of comparison to discover how the target textual dataset differs from the reference textual dataset. In some examples, the reference textual dataset may be a general corpus of documents in one or more languages and corresponding to one or more genres or domains for use as a baseline of comparison with the target textual dataset. The reference textual dataset may or may not be in the same domain as the target textual dataset, or have the same style or level of formality as the target textual dataset, which may affect how the model performs on the target textual dataset as compared to the reference textual dataset.

In other examples, the reference textual dataset may be a corpus of documents with which a specific model was trained. If such a corpus has textual characteristics that are extremely close to the textual characteristics of the target textual dataset to which that model is to be applied, the model is likely to perform better on the target textual dataset than if the training dataset textual characteristics that are very different from those of the target textual dataset. This type of problem often arises where models are trained in a research environment and then applied to real-world situations, without re-training or re-tuning efforts that account for these different contexts. As a result, the models often do not perform as expected in the real-world situations. Some examples of the present disclosure can overcome these problems by identifying and flagging these types of situations for a user.

For example, the reference textual dataset may be training data that was previously used to train the model. The target textual dataset may be new data that was not used to train the model. Based on the similarity score indicating the similarities and differences between the reference textual dataset and the target textual dataset, the system can predict how much accuracy degradation the model will experience if the model is applied to the target textual dataset. The predicted level of accuracy degradation may be quantified, in some examples, as the estimated amount of loss or the estimated reduction in accuracy that will result if the model is applied to the target textual dataset as compared to a baseline amount. The baseline amount may be a baseline loss level or a baseline accuracy level determined using the reference textual dataset. Once determined, the predicted level of accuracy degradation may be output as one of the insights in the graphical user interface.

In some examples, the system can determine a recommended setting value for the model (e.g., model type) selected by the user. For example the system can apply a set of rules to the second set of metrics to determine a recommended setting value for the model selected by the user. The system can then output a recommendation that the user update the setting to the recommended value to improve modeling results. The user may then update the setting to the recommended value using the graphical user interface and apply the model with the updated setting value to the target textual data.

In some examples, the system can determine a recommended model to apply to the target textual dataset. The recommended model may be a specific model or a specific model type, such as a neural network or a regression model. For example the system can apply a set of rules to the second set of metrics to determine a recommended type of model to apply to the target textual dataset. If the recommended model is different from the model selected by the user, the system can output a recommendation that the user select the recommended model to improve modeling results. The user may then apply the recommended model to the target textual data. In some examples, the user may be able to interact with the graphical user interface to select and apply the recommended model.

FIGS. 1-12 depict examples of systems and methods usable for leveraging text profiles to select and configure models for use with textual datasets according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that may be collectively be referred to herein as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages for leveraging text profiles to select and configure models for use with textual datasets, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data usable for leveraging text profiles to select and configure models for use with textual datasets to a network-attached data store 110 for storage. The computing environment 114 may later retrieve the data from the network-attached data store 110 and use the data to lavage text profiles to select and configure models for use with textual datasets.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for leveraging text profiles to select and configure models for use with textual datasets.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for leveraging text profiles to select and configure models for use with textual datasets. For example, the computing environment 114, a network device 102, or both can implement one or more versions of the processes discussed with respect to any of the figures.

Figure 2:
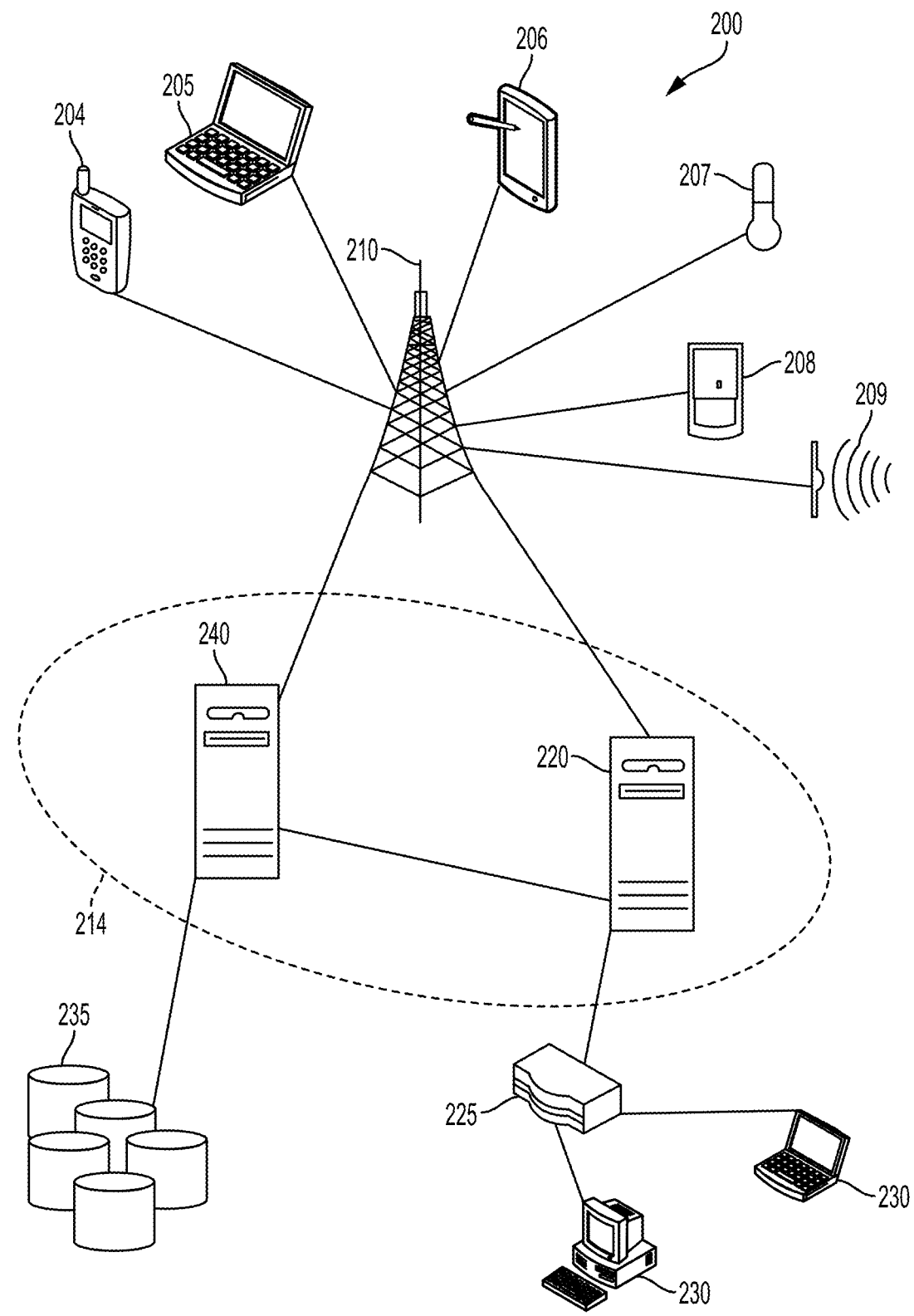
FIG. 2 depicts an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing.

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project for leveraging text profiles to select and configure models, the computing environment 214 can perform a pre-analysis of the data. The pre-analysis can include determining whether the data is in a correct format for leveraging text profiles to select and configure models for use with textual datasets and, if not, reformatting the data into the correct format.

Figure 3:
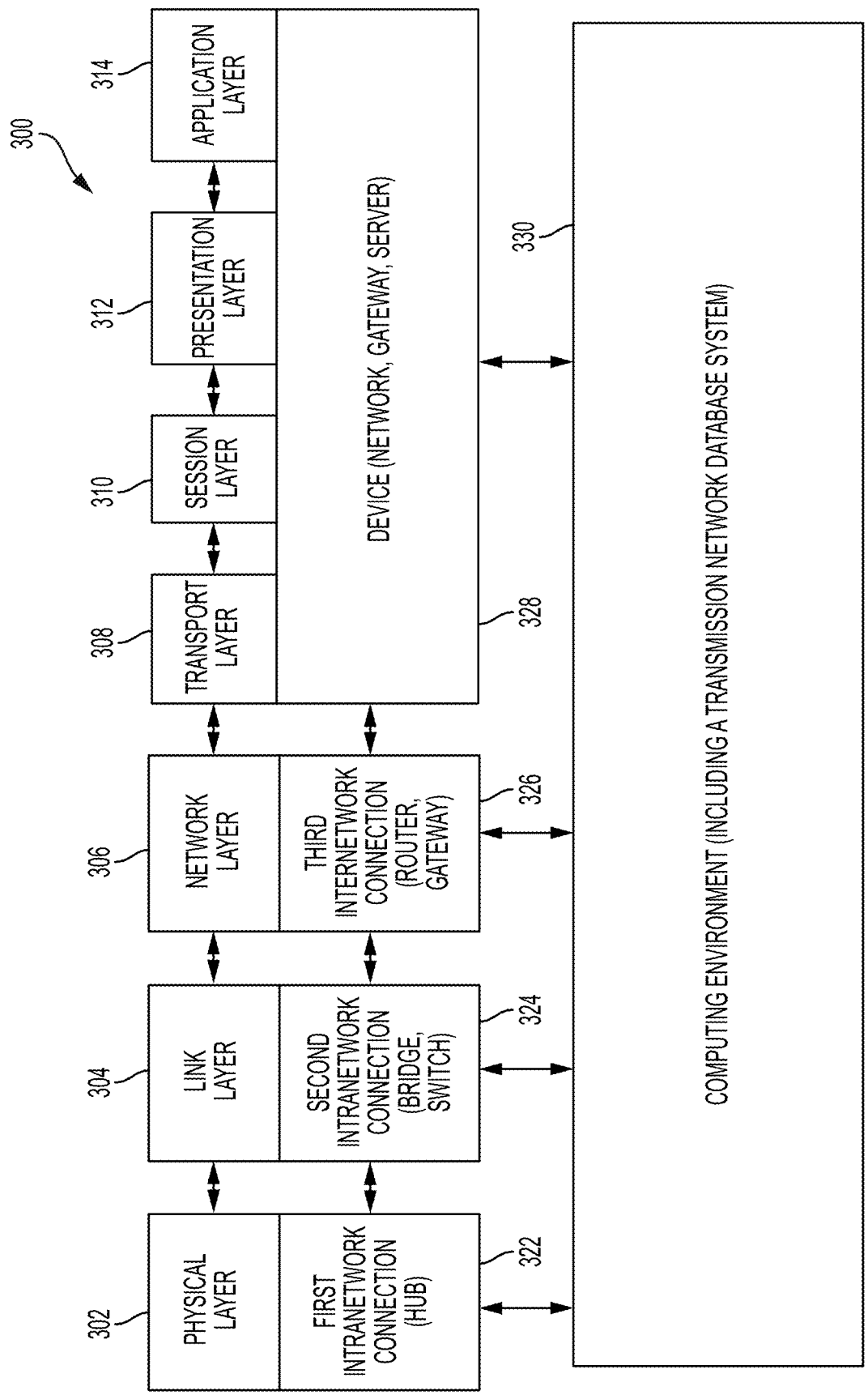
FIG. 3 depicts a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a dataset to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for leveraging text profiles to select and configure models for use with textual datasets, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for testing a software application.

Figure 4:
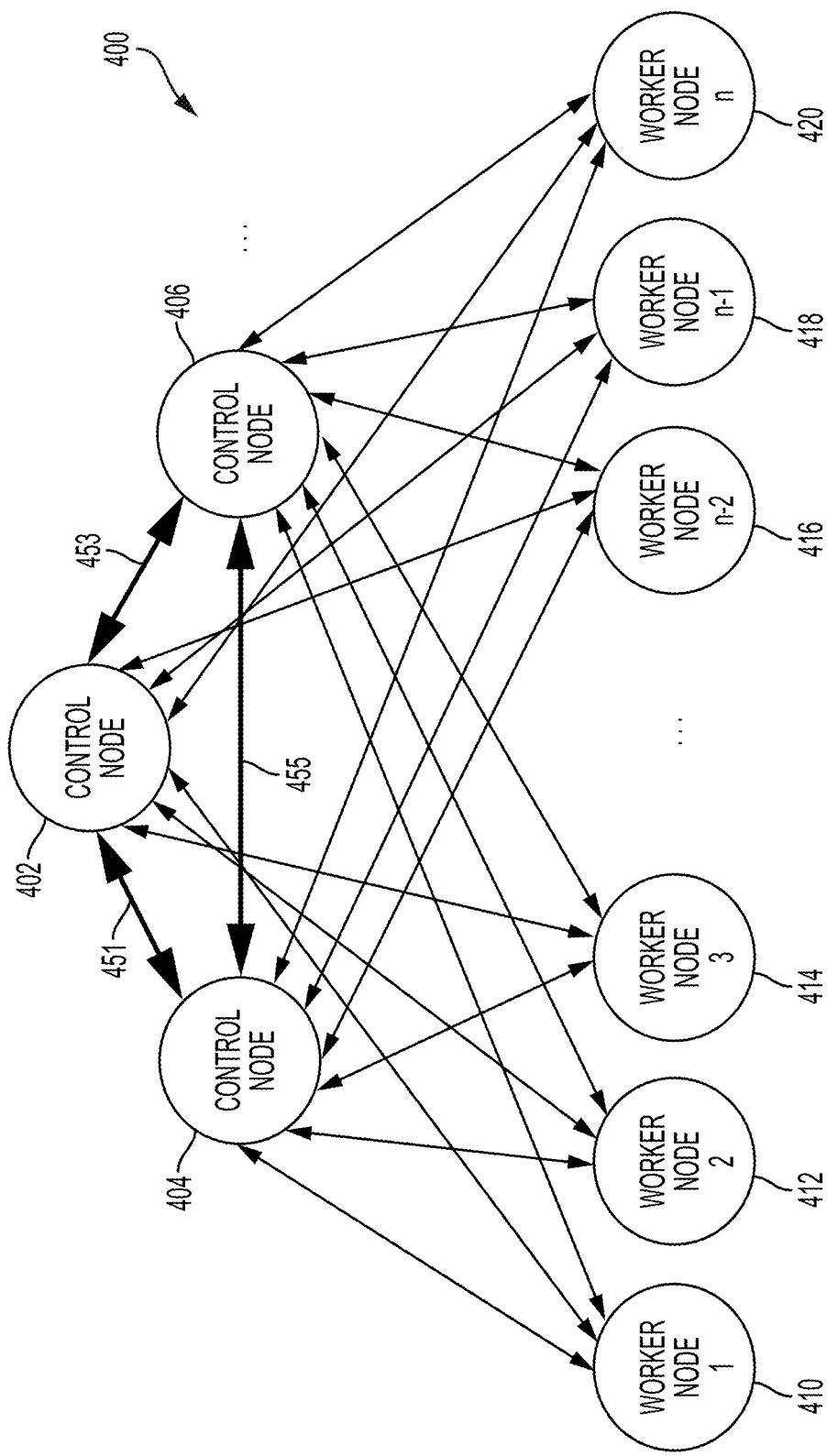
FIG. 4 depicts a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or dataset is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to testing a software application. The project may include a dataset. The dataset may be of any size and can include override data or debugging data. Once the control node 402-406 receives such a project, the control node may distribute the dataset or projects related to the dataset to be performed by worker nodes. Alternatively, the dataset may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for testing a software application can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may test a software application using at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used to implement one or more features described herein, for example to test a software application.

Figure 5:
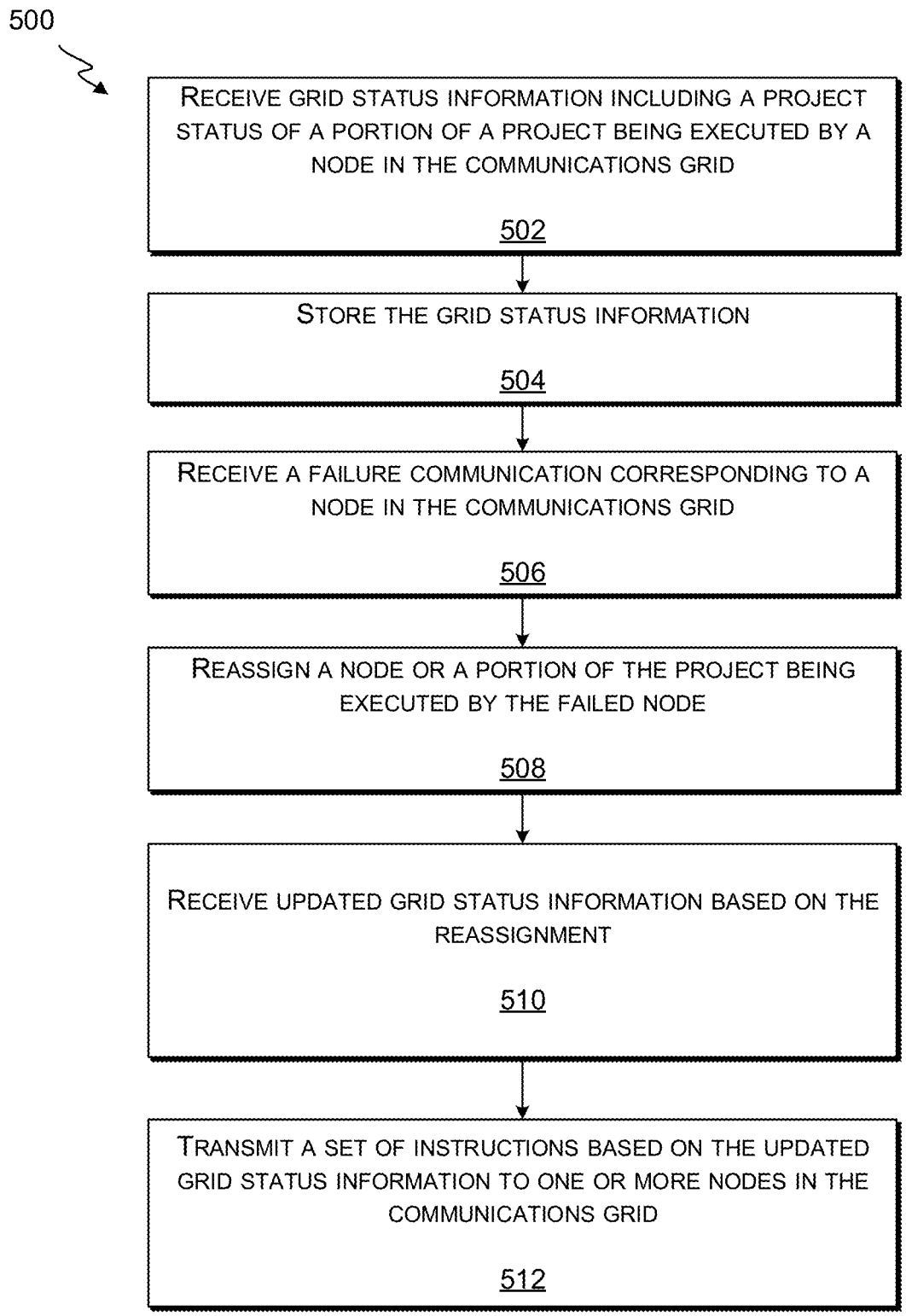
FIG. 5 depicts a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
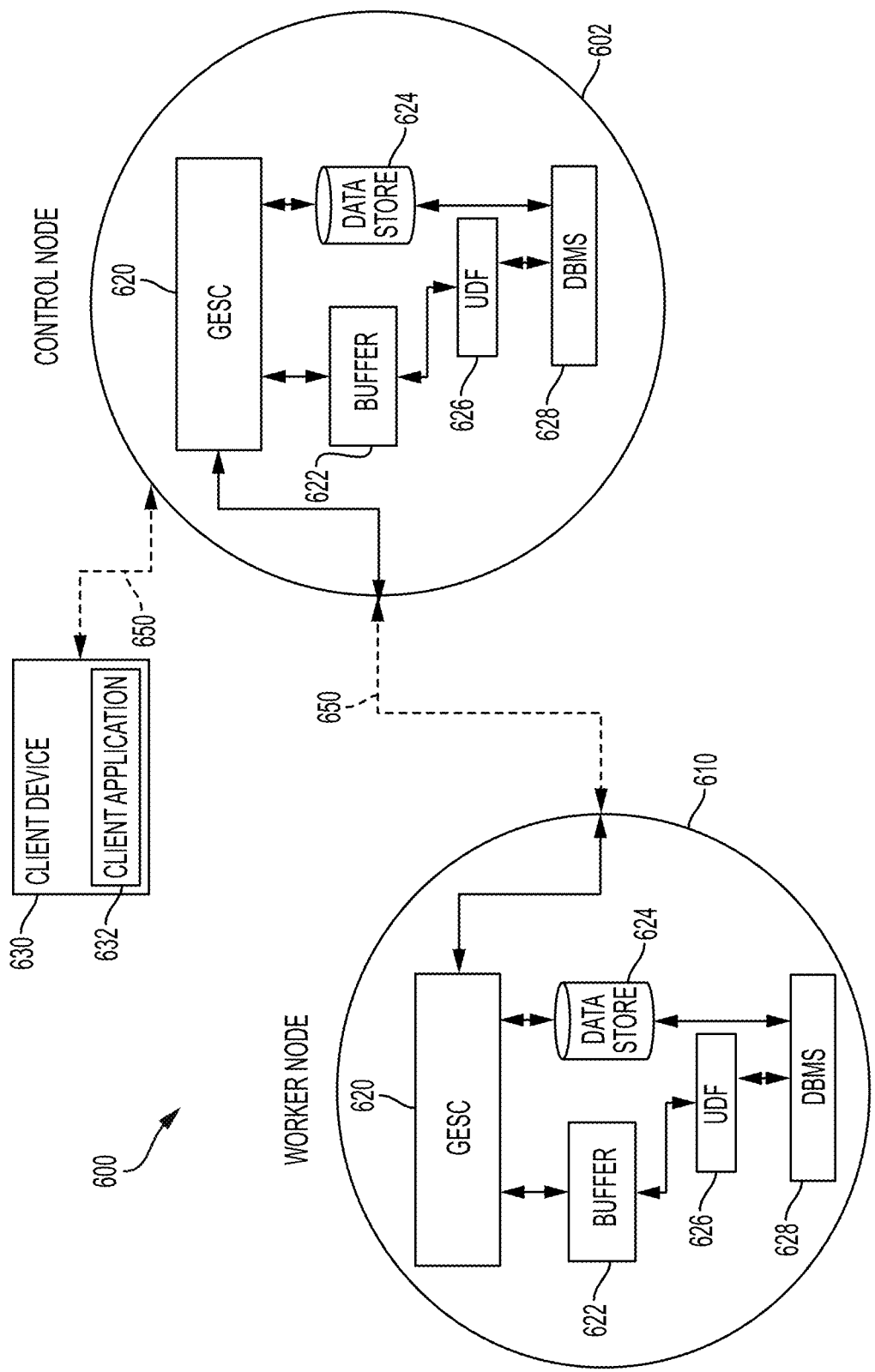
FIG. 6 depicts a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
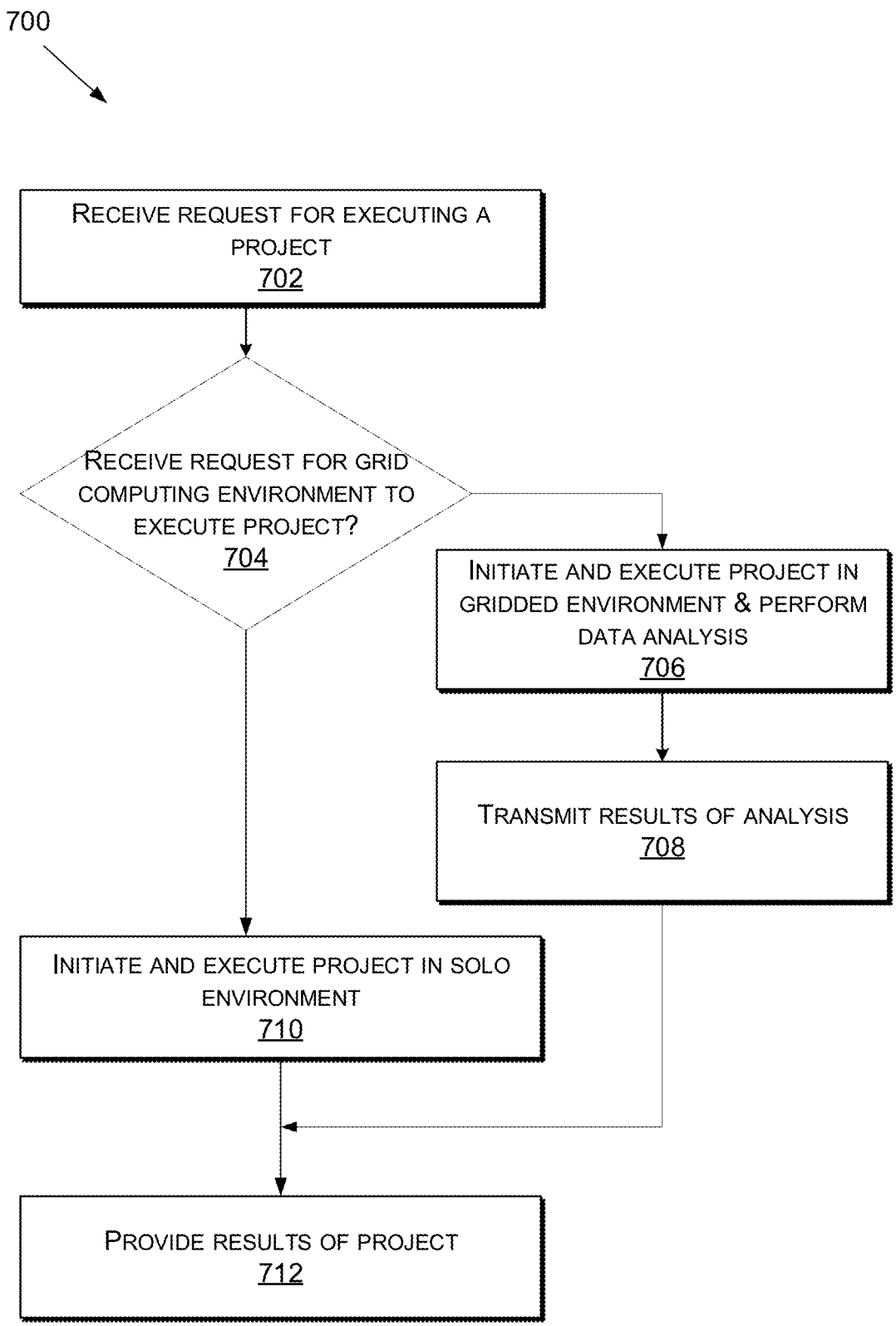
FIG. 7 depicts a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
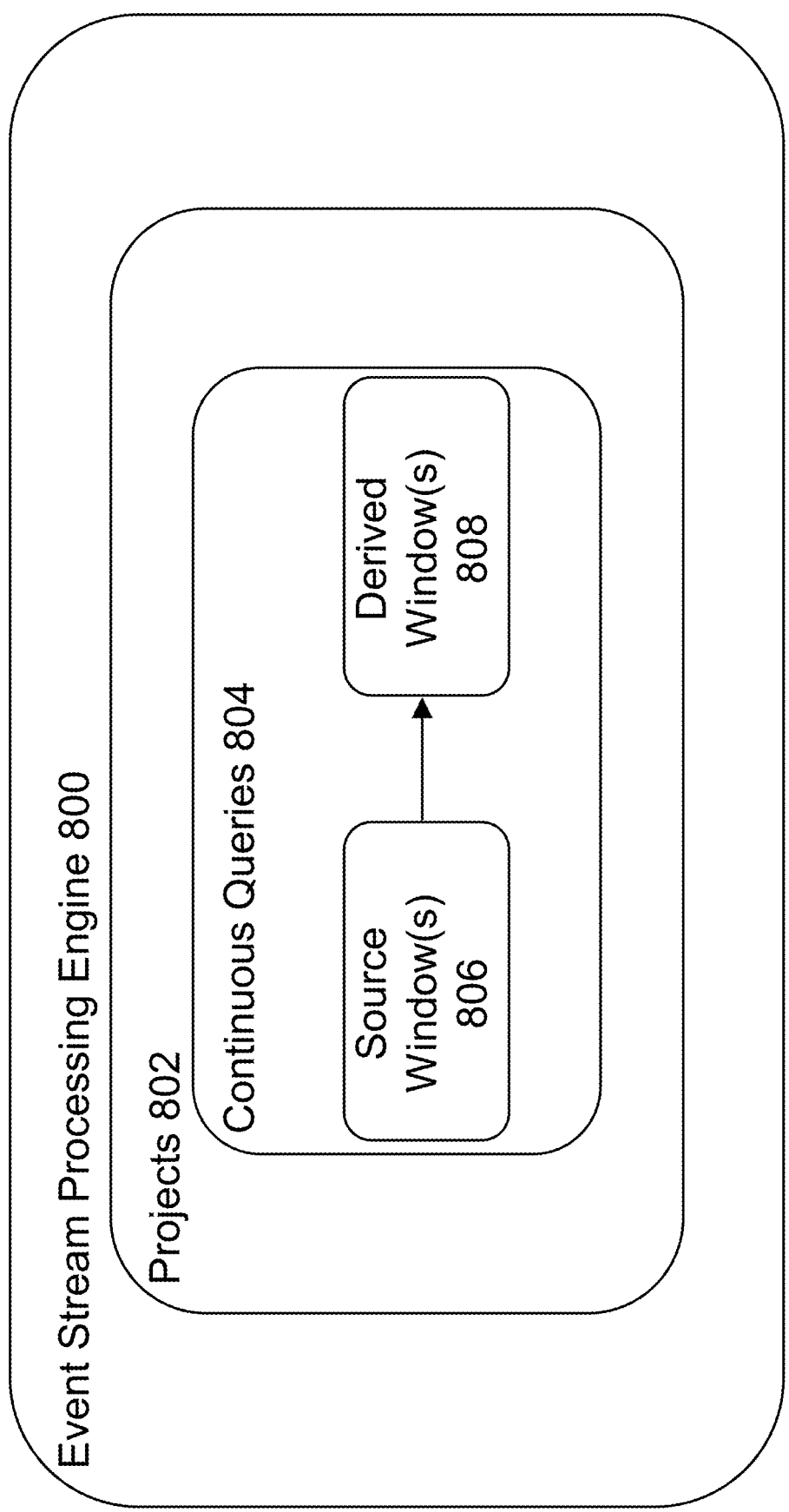
FIG. 8 depicts a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
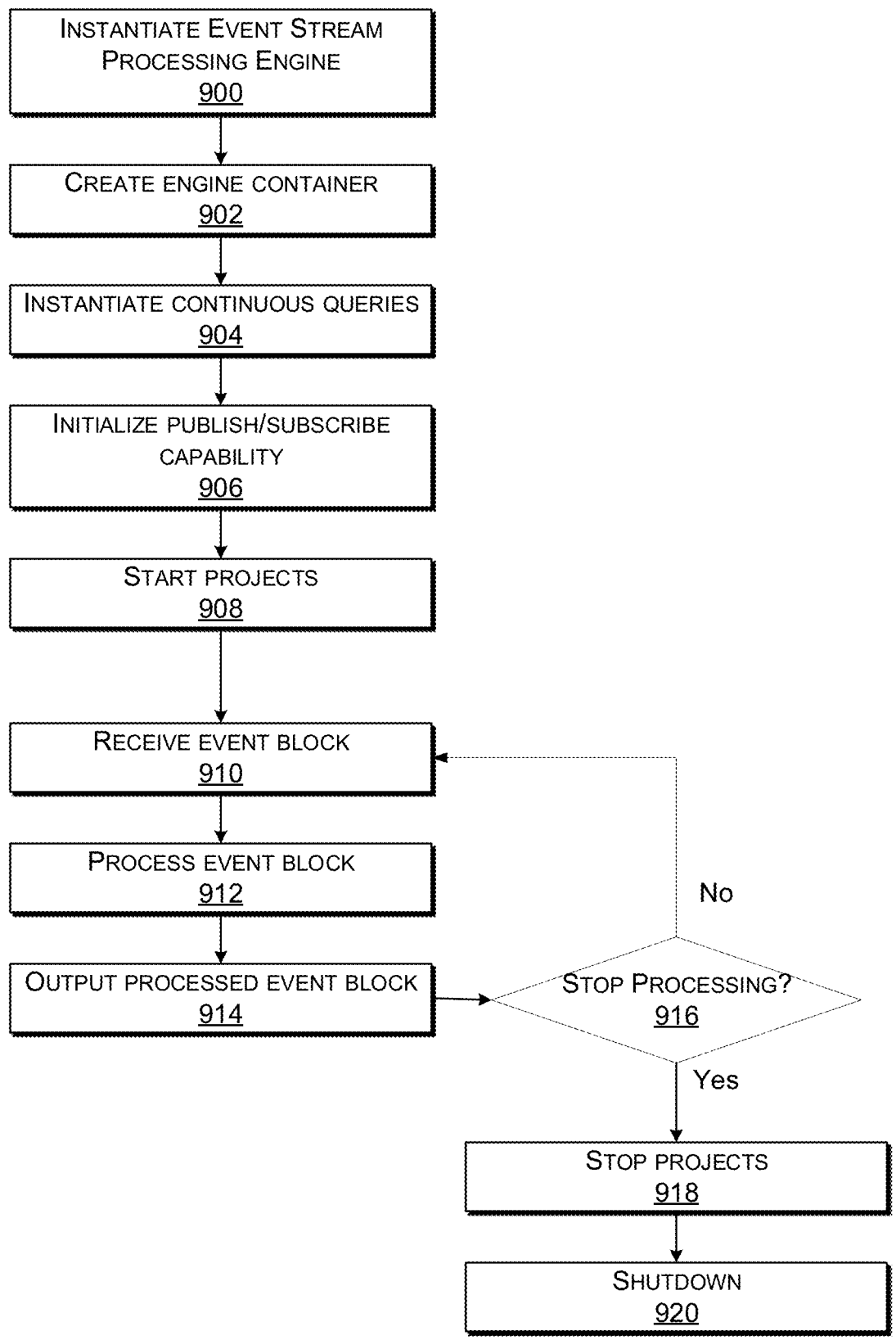
FIG. 9 depicts a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
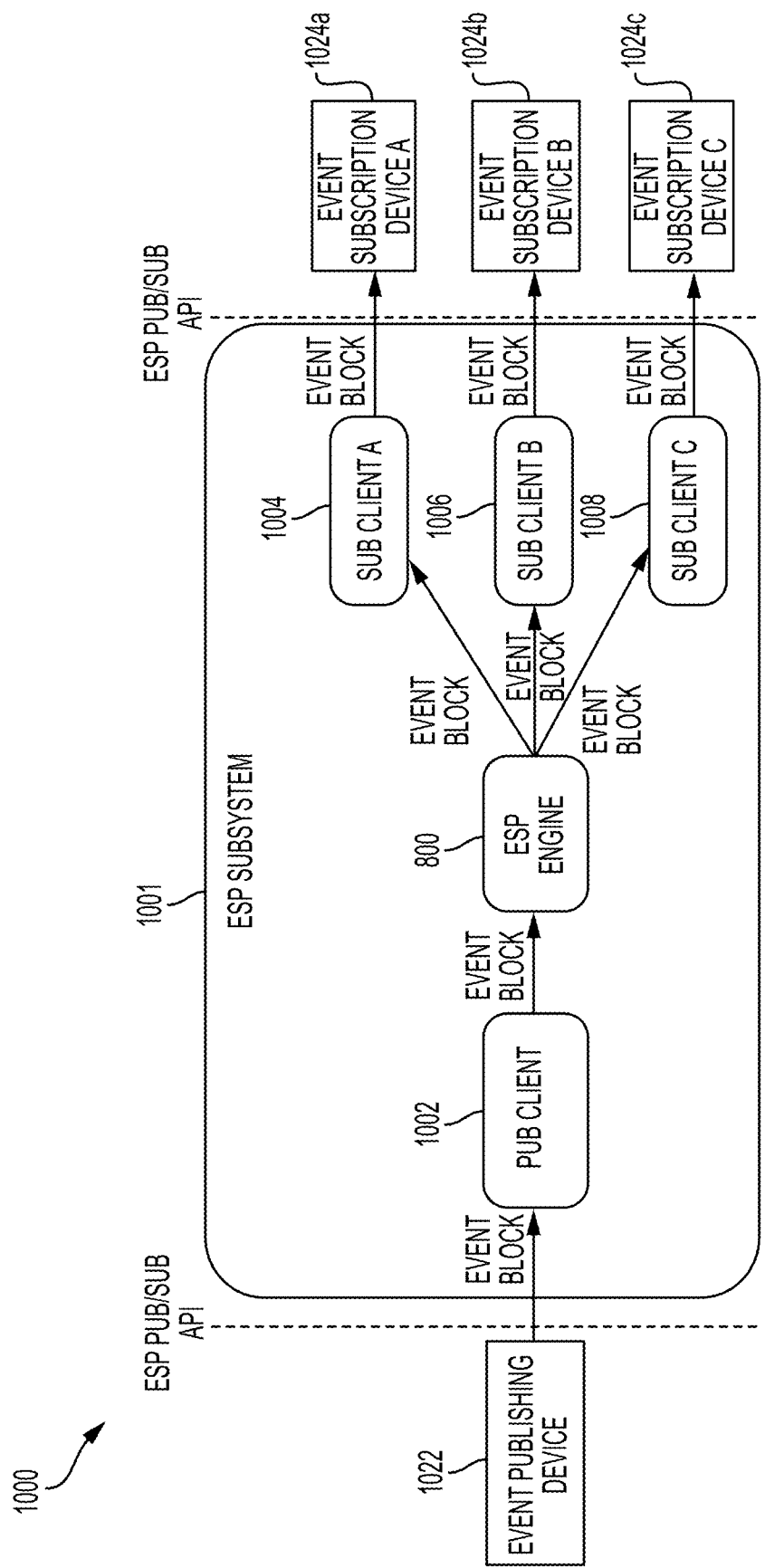
FIG. 10 depicts a block diagram of an ESP system interfacing between a publishing device and multiple event subscribing devices according to some aspects.

FIG. 10 is a block diagram of an ESP system 1000 interfacing between publishing device 1022 and event subscription devices 1024*a-c* according to some aspects. ESP system 1000 may include ESP subsystem 1001, publishing device 1022, an event subscription device A 1024*a*, an event subscription device B 1024*b*, and an event subscription device C 1024*c*. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscription device A 1024*a*, event subscription device B 1024*b*, and event subscription device C 1024*c*. ESP system 1000 may include a greater or a fewer number of event subscription devices of event subscription devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscription device A 1024*a*, event subscription device B 1024*b*, and event subscription device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscription device A 1024a, event subscription device B 1024b, and event subscription device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscription device A 1024a using the publish/subscribe API. Subscribing client B 1006 may be started by an event subscription application B executing at event subscription device B 1024b using the publish/subscribe API. Subscribing client C 1008 may be started by an event subscription application C executing at event subscription device C 1024c using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscription devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
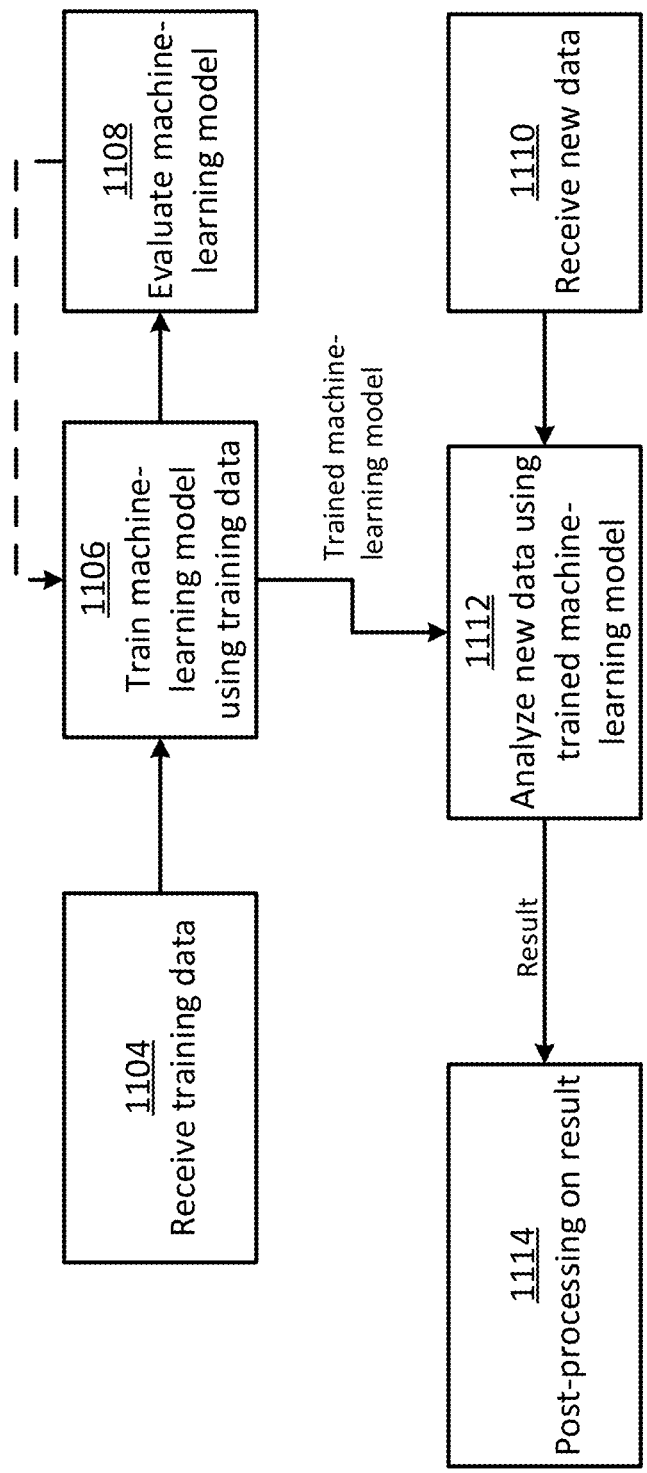
FIG. 11 is a flow chart of an example of a process for generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and using machine-learning models can include SAS Enterprise Miner (e.g., with the SAS Text Miner add-on), SAS Rapid Predictive Modeler, SAS Model Manager, SAS Cloud Analytic Services (CAS), and SAS Viya (e.g., including Visual Text Analytics and Visual Analytics), all of which are by SAS Institute Inc.® of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. An evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
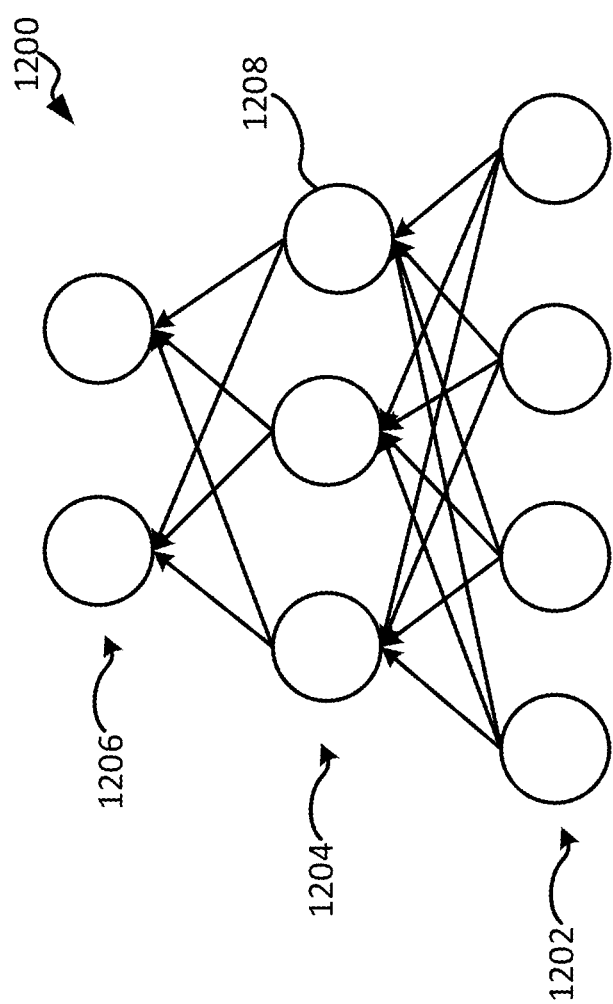
FIG. 12 is a node-link diagram of an example of a neural network according to some aspects.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and quickly executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices.

Furthermore, these processors may also be employed in heterogeneous computing architectures with a number of and a variety of different types of cores, engines, nodes, and/or layers to achieve various energy efficiencies, thermal processing mitigation, processing speed improvements, data communication speed improvements, and/or data efficiency targets and improvements throughout various parts of the system when compared to a homogeneous computing architecture that employs CPUs for general purpose computing.

Figure 13:
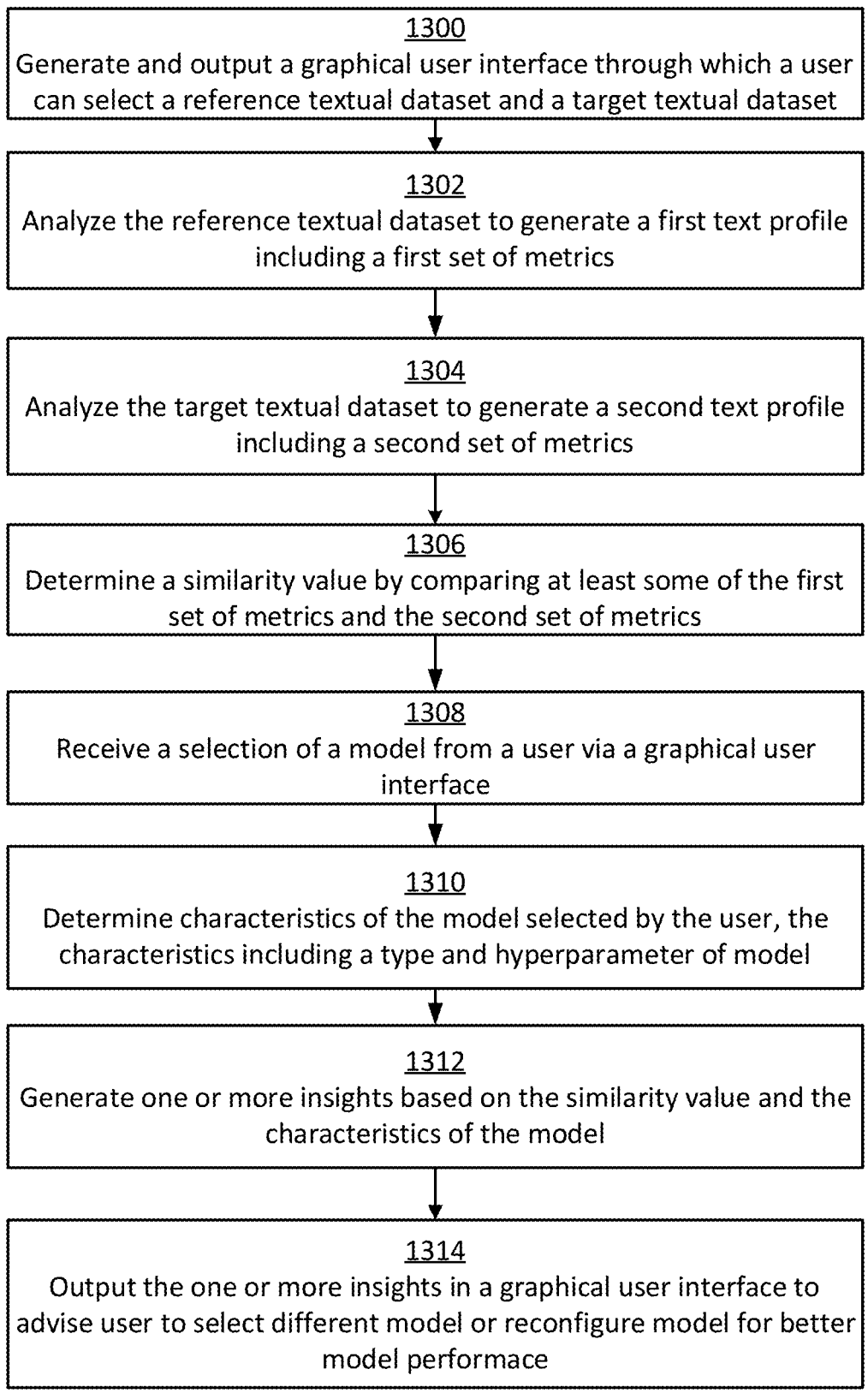
FIG. 13 is a flow chart of an example of a process executable by a processor for generating one or more insights about model behavior according to some aspects.

FIG. 13 is a flow chart of an example of a process executable by a processor according to some aspects. Although the flow chart shows a specific number and sequence of operations, this is not intended to be limiting. Other examples may involve more operations, fewer operations, different operations, or a different order of the operations than is shown in FIG. 13.

In block 1300, the processor generates and outputs a graphical user interface through which a user can select a target textual dataset to undergo subsequent analysis. In some examples, the user may also be able to select a reference textual dataset through the graphical user interface. Alternatively, the reference textual dataset may be preset by default.

In block 1302, the processor analyzes the reference textual dataset to generate a first text profile including a first set of metrics. In some examples, the processor can analyze the textual dataset using text-mining techniques, such as natural language processing (NLP) techniques, to generate the metrics in the text profile. In some examples, the text-mining techniques can perform tokenization, sentence-boundary detection, contraction normalization, multiword analysis, token-type identification and categorization, pronoun classification, clause analysis, dictionary analysis (e.g., to identify known words) and lemmatization (morphological analysis), genre categorization, dependency parsing, grammatical-pattern identification, misspelling analysis, topic analysis, or any combination of these.

One metric that can be included in the first set of metrics can be the number of languages (e.g., English, Spanish, and French would be three languages) or dialects that are present in the target textual dataset. To compute this metric, algorithms for language identification or dialect identification can be applied. For example, a processor may use execute an algorithm that relies on dialect-specific or language-specific keywords to identify languages in the reference textual dataset. The linguistic variation across datasets from different languages is likely to be very high. Other examples of metrics can be found in the following table.

TABLE 1

Example Metrics

| Type | Description |
| --- | --- |
| int64 | Total number of function words in the dataset. |
| float | Percentage of uppercase to lowercase letters. |
| int64 | Number of sentences in the longest document by sentence count. |
| float | Average number of tokens per sentence. |
| int64 | Number of tokens in the longest sentence by token count. |
| int64 | Total number of unique words in the dataset. |
| float | Average number of characters (or bytes for some languages) per token (all non-unique tokens counted). |
| int64 | Number of characters/bytes in the longest token. |
| int64 | Number of unique tokens in the dataset. |
| int64 | Number of forms (unique tokens) to account for 80% of the data. |
| float | Percentage of tokens that are content words (not numeric or stop words and not punctuations). |
| float | Percentage of tokens in the dataset that are stop words. |

TABLE 1-continued

Example Metrics

| Type | Description |
| --- | --- |
| float | Percentage of tokens with a number/digit in them. |
| float | Percentage of tokens that are punctuations. |

In above table, the column on the left side indicates the data formats of the metrics, such as string, integer in 64 bit format, and float number. The column on the right side of the table provides descriptions of the metrics. Note that the above examples of data formats and metrics are intended to be illustrative and non-limiting.

Other types of data formats and metrics may also be used. Some of these other examples of metrics are described in greater detail later on with reference to FIG. 15. These metrics may generally fall into the categories of vocabulary diversity, information density, language formality, information complexity, and domain specificity.

In block 1304, the processor analyzes a target textual dataset to generate a second text profile and second set of metrics. The second set of metrics can include any of the metrics described herein. Any of the processes described herein may be executed to determine the second set of metrics for the target textual dataset.

In block 1306, the processor determines a similarity value by comparing at least some of the first and second metrics. The similarity value is a quantitative indicator that represents how similar the target textual dataset is to the reference textual dataset by comparing the second text profile to the first text profile. Comparing the second text profile to the first text profile may involve comparing at least some of the second set of metrics to at least some of the first set of metrics. In some examples, each metric in the first set of metrics can be compared separately to each metric in the second set of metrics. The following paragraphs describe some examples of processes for determining a similarity value corresponding to the reference and target textual datasets.

Datasets can be compared based on some or all of the metrics discussed herein to compute a similarity value. One similarity value that can be computed based on these metrics is the Jensen-Shannon divergence/difference. Other similarity values may also be used instead of, or in combination with, Jensen-Shannon to determine the similarity between textual datasets (e.g., corpora). Examples of such similarity values can include Euclidean distance, Manhattan distance, Cosine distance, Chi-square, Spearman's rho (p), Jaccard similarity calculation, nearest neighbor vocabulary or topic comparisons, or any combination of these.

Figure 20:
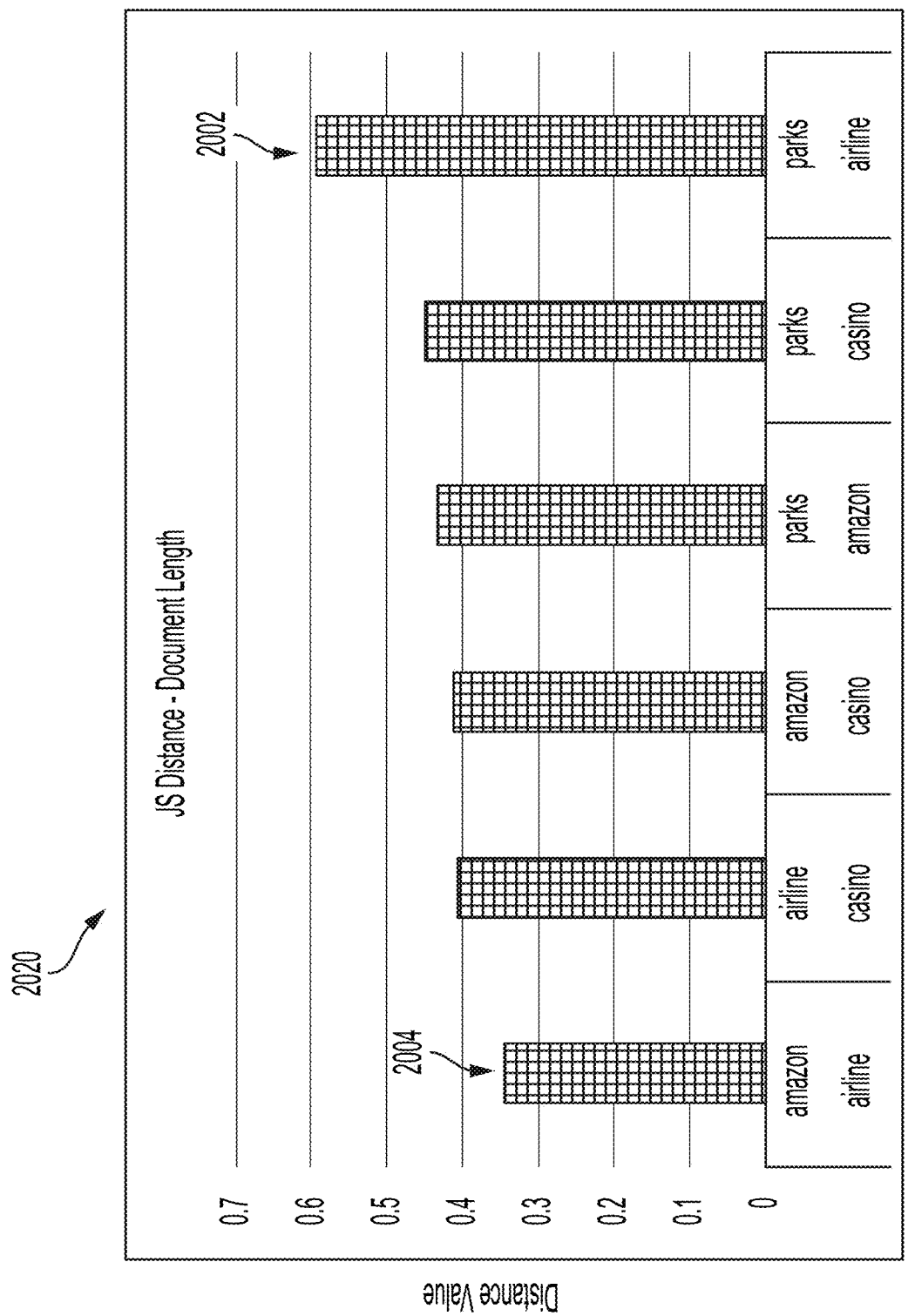
FIG. 20 is a chart showing an example of distance values representing the similarity between pairs of textual datasets according to some aspects.

An example of using Jensen-Shannon difference on the document-length metric (e.g., as determined by the sentence count-per-document) will now be described. Looking at the metrics for sentences-per-document across four English data sets yields a Jensen-Shannon distance chart like the bar chart 2020 shown in FIG. 20. A higher distance value indicates that the two textual datasets are less similar than a lower distance value. From the bar chart 2020, it is apparent that the most similar datasets with respect to document length are the Amazon® and airline datasets, as shown by bar 2004. The most different datasets are the parks and airline datasets, as shown by bar 2002. One interpretation of this data is that models, which rely on document length or are sensitive to different document lengths in the data, will be at more risk of poor accuracy or accuracy loss when applied to such datasets.

Another example may involve using the proportions of uppercase letters to lowercase letters in the textual datasets as a basis for determining their similarity. The proportions of uppercase letters to lowercase letters can indicate how formal the textual dataset is. To compute these metrics for the textual datasets, the processor can compute the proportions of uppercase letters to lowercase letters in each textual dataset. The proportion of uppercase letters to lowercase letters in a given textual dataset can be converted into a percentage value for that dataset. The percentage value can serve as one of the metrics in the textual profile for that dataset. Next, the processor can compare the two metrics for each textual dataset by computing a ratio of the two metrics, where one of the metrics will have a smaller percentage value and the other metric will have a larger percentage value. In this way, the ratio can be represented as a percentage value or a number between 0 to 1. A larger ratio number can indicate the reference textual dataset and the target textual dataset have similar language formality. A smaller ratio number can indicate the reference textual dataset and the target textual dataset have less similar language formality. The ratio may be, or may be used as a factor to compute, a similarity value.

Another example may involve using the number of unique words in the textual datasets as a basis for determining their similarity. The number of unique words can indicate the degree of vocabulary diversity in the textual dataset. To compute these metrics for the textual datasets, the processor can compute the number of unique words in each textual dataset. The number of unique words in a given textual dataset can be converted into a percentage value by dividing the total number of words in the textual dataset by the number of unique words in the textual dataset. Next, the processor can compare the two metrics for each textual dataset by computing a ratio of the two metrics, with the one of the metrics having a smaller percentage value and the other metric having a larger percentage value. In this way, the ratio can be represented as a percentage value or a number between 0 to 1. A larger ratio number can indicate the reference textual dataset and the target textual dataset have a similar amount of vocabulary diversity. A smaller ratio number can indicate the reference textual dataset and the target textual dataset have less similar amounts of vocabulary diversity. The ratio may be, or may be used as a factor to compute, a similarity value.

Another example may involve using the number of function words in the textual datasets as a basis for determining their similarity. In general, content words carry the most meaning in a document, and the function words are used to highlight relationships and situate that meaning in context. Thus, a higher number of function words over content words can indicate a lower level of information density. To compute these metrics for the textual datasets, the processor can compute the number of function words in each textual dataset. The number of function words in a given textual dataset can be converted into a percentage value by dividing the total number of words in the textual dataset by the number of function words in the textual dataset. Next, the processor can compare the two metrics in each textual dataset by computing a ratio of the two metrics, where one of the metrics will have a smaller percentage value and the other metric will have a larger percentage value. In this way, the ratio can be represented as a percentage value or a number between 0 to 1. A larger ratio number can indicate the reference textual dataset and the target textual dataset have similar levels of information density. A smaller ratio number can indicate the reference textual dataset and the target textual dataset have less similar levels of information density. The ratio may be, or may be used as a factor to compute, a similarity value.

Other metrics can be compared to one another, additionally or alternatively to the ones described above, to determine how similar and dissimilar the target textual dataset is to the reference textual dataset. And while the above similarity values are represented as ratios or percentages, in other examples the similarity values may be represented as other types of numerical values.

Some or all of the similarity information can be used to generate a single similarity value or a similarity profile. For example, an algorithm may be applied to the above ratios to compute a single similarity value. The algorithm may combine (e.g., aggregate) together all of the individual ratios into a single similarity value. In other examples, the similarity values may be incorporated into a similarity profile (e.g., a profile that contains the multiple similarity values) representing the similarity between the target textual dataset and the reference textual dataset.

Some or all of the similarity value can be used to generate a single similarity value or a similarity profile through a weighting algorithm. The weighting algorithm can be used to weight the similarity value or the similarity profile that was calculated based on a various factors or metrics described above, such as document-length, number of unique words, and number of function words. In some examples, the similarity value or the similarity profile can be weighted by multiplying a weighting value through the weighting algorithm based on the importance of the similarity value or the similarity profile. For example, if document length is considered relatively less important among all metrics or to a specific model, then the similarity value or the similarity profile can be decreased by multiplying it by a weighting factor between 0 to 1. Conversely, if document length is considered relatively more important among all metrics or to a specific model, then the similarity value or the similarity profile can be increased by multiplying it by a weighting factor larger than 1.

In some examples, the Jensen-Shannon difference value can be normalized to make the comparison result between different datasets more apparent. To normalize the Jensen-Shannon difference value, a Jensen-Shannon difference associated with a certain type metric between datasets can be divided by the highest Jensen-Shannon difference value. The normalized Jensen-Shannon difference value will then be a numerical value between 0 to 1. If the normalized Jensen-Shannon difference is closer to 1, then the two different datasets may be relatively different to one another. And if the normalized Jensen-Shannon difference is closer to 0, then the two different datasets may be relatively similar to one another.

Figure 21:
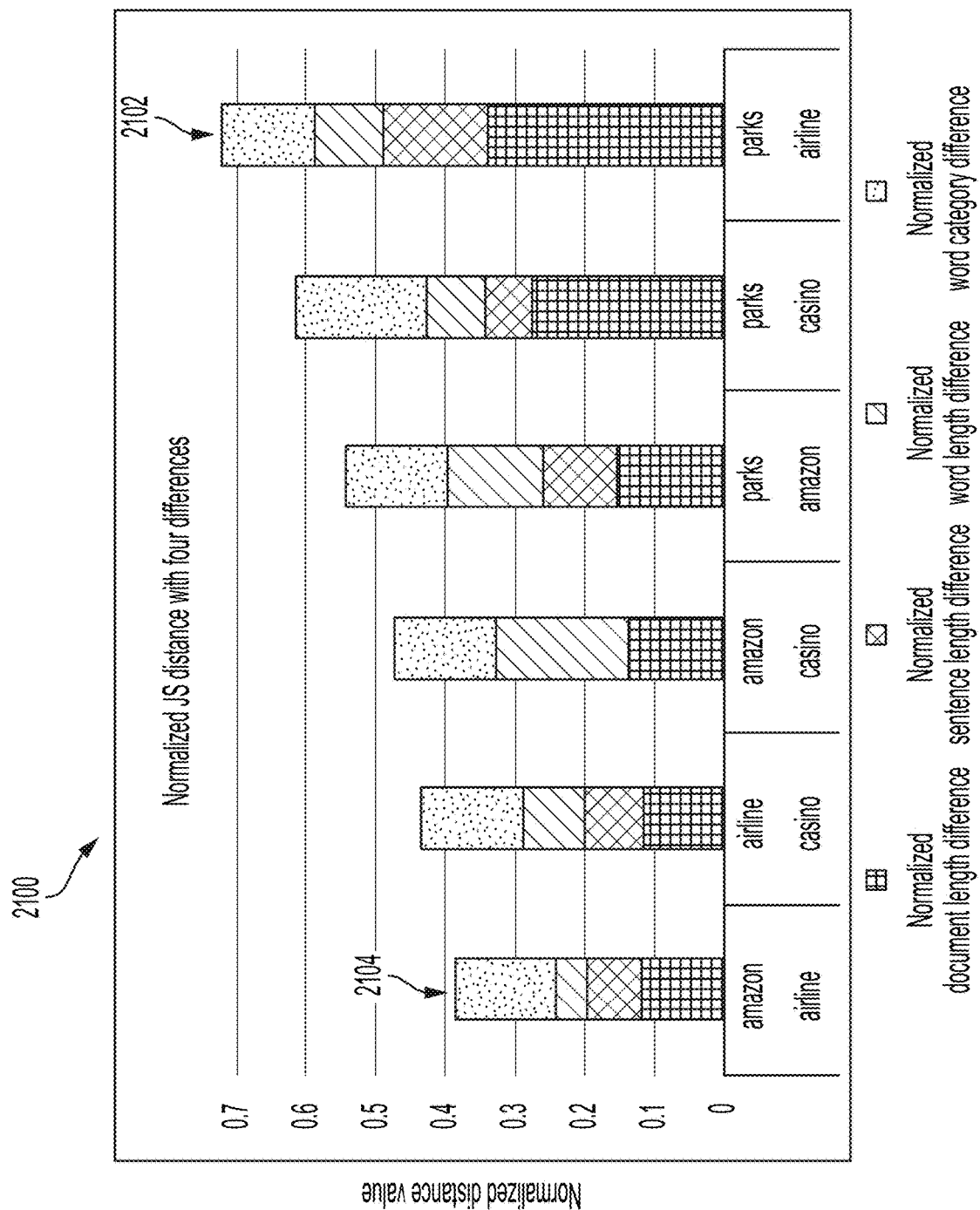
FIG. 21 is a chart showing an example of normalized Jensen-Shannon (JS) distance values between pairs of textual datasets according to some aspects.

An example of using normalized Jensen-Shannon differences with respect to four metric types (e.g., normalized document length difference, normalized sentence length difference, normalized word length difference, and normalized word category) will now be described. Looking at the four metrics for across four English data sets yields a Jensen-Shannon distance chart like the bar chart 2100 shown in FIG. 21. A higher normalized distance value indicates that the two textual datasets are less similar than a lower distance value. From the bar chart 2100, it is apparent that the most similar datasets with respect to document length are the Amazon® and airline datasets, as shown by bar 2104. The most different datasets are the parks and airline datasets, as shown by bar 2102. After comparing the four metrics across the four datasets in FIG. 21, an appropriate model can be selected based on considerations of risk level and expected accuracy loss. For example, a model trained on the Amazon® dataset may suitable for use with the airline dataset because the four types of metrics show high similarity between those datasets. In contrast, a model trained on the parks dataset may not suitable for use with the airline dataset because the four types of metrics show low similarity between those datasets.

Figure 22:
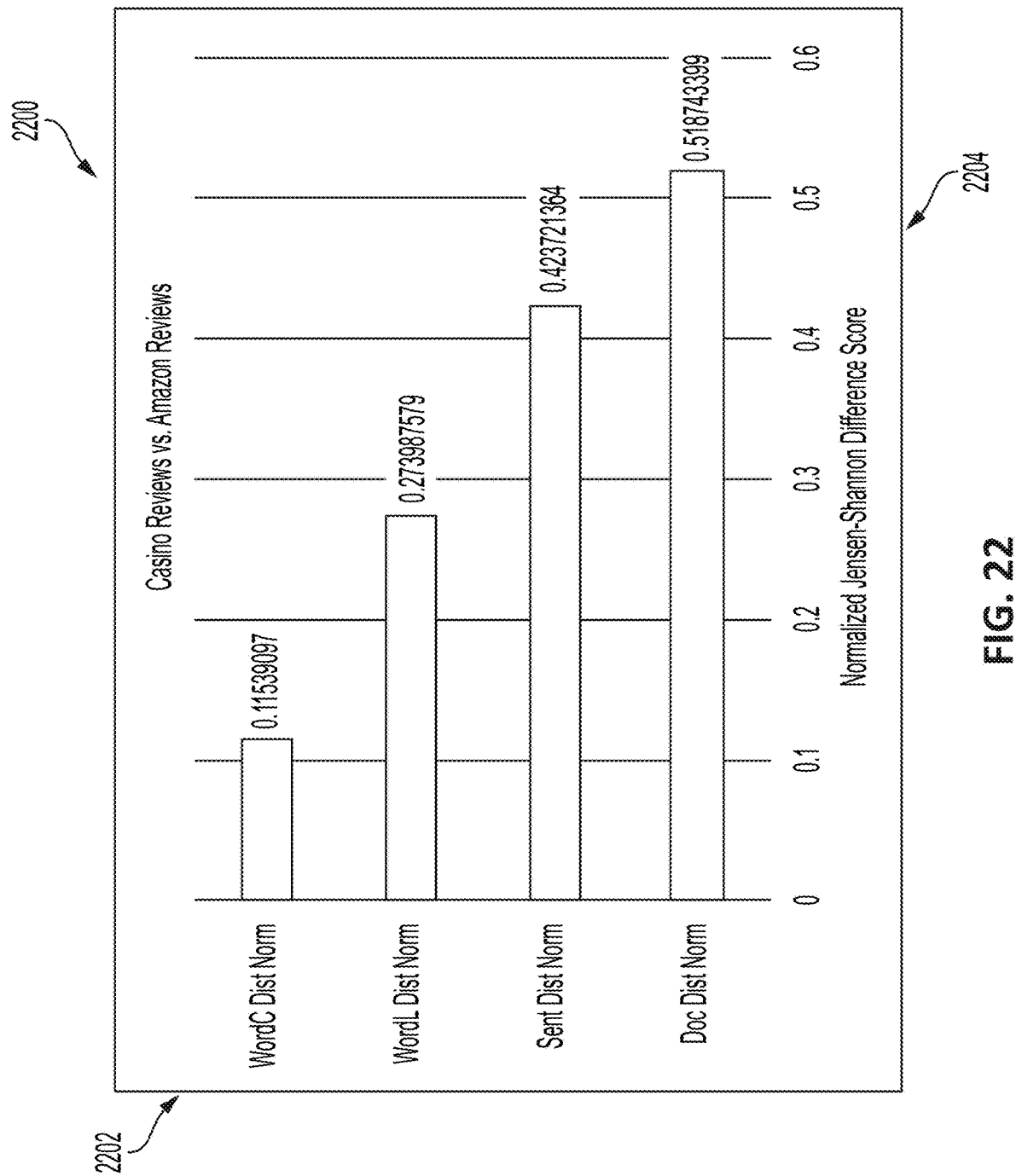
FIG. 22 is a chart showing an example of normalized JS difference scores relating to four metrics associated with Casino and Amazon® datasets according to some aspects.

More metrics can be used to compare two datasets to provide more data points about their similarities and differences. In order to make the comparison results more apparent, the manner described above regarding normalizing Jensen-Shannon difference can be employed. One such example is shown in FIG. 22. This example shows the comparison result 2200 of four different normalized metrics used to determine similarities between datasets Casino and Amazon®. The four different normalized metrics 2202 are listed along the Y-axis and include normalized word category difference (WordC Dist Norm), normalized word length difference (WordL Dist Norm), normalized sentence length difference (Sent Dist Norm), and normalized document length difference (Doc Dist Norm). The X-axis 2504 shows similarity scores. The word category metric and the word length metric indicate that the two datasets are very similar, given that their similarity scores are closer to zero. The sentence length and document length metrics are both moderately different, falling towards the middle of the difference range.

Figure 23:
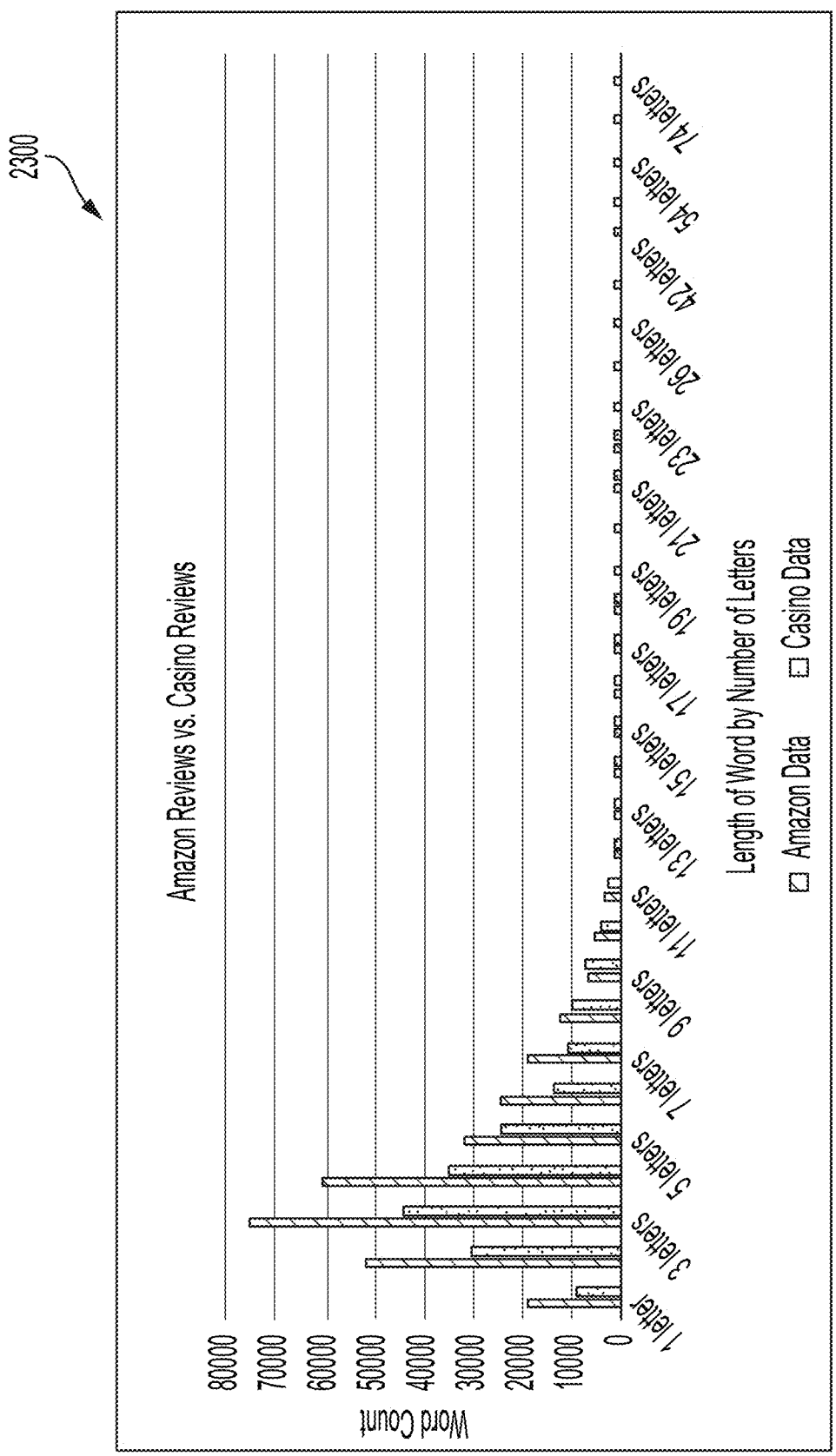
FIG. 23 is a histogram showing an example of raw word-length metrics in relation to Amazon® and Casino datasets according to some aspects.
Figure 24:
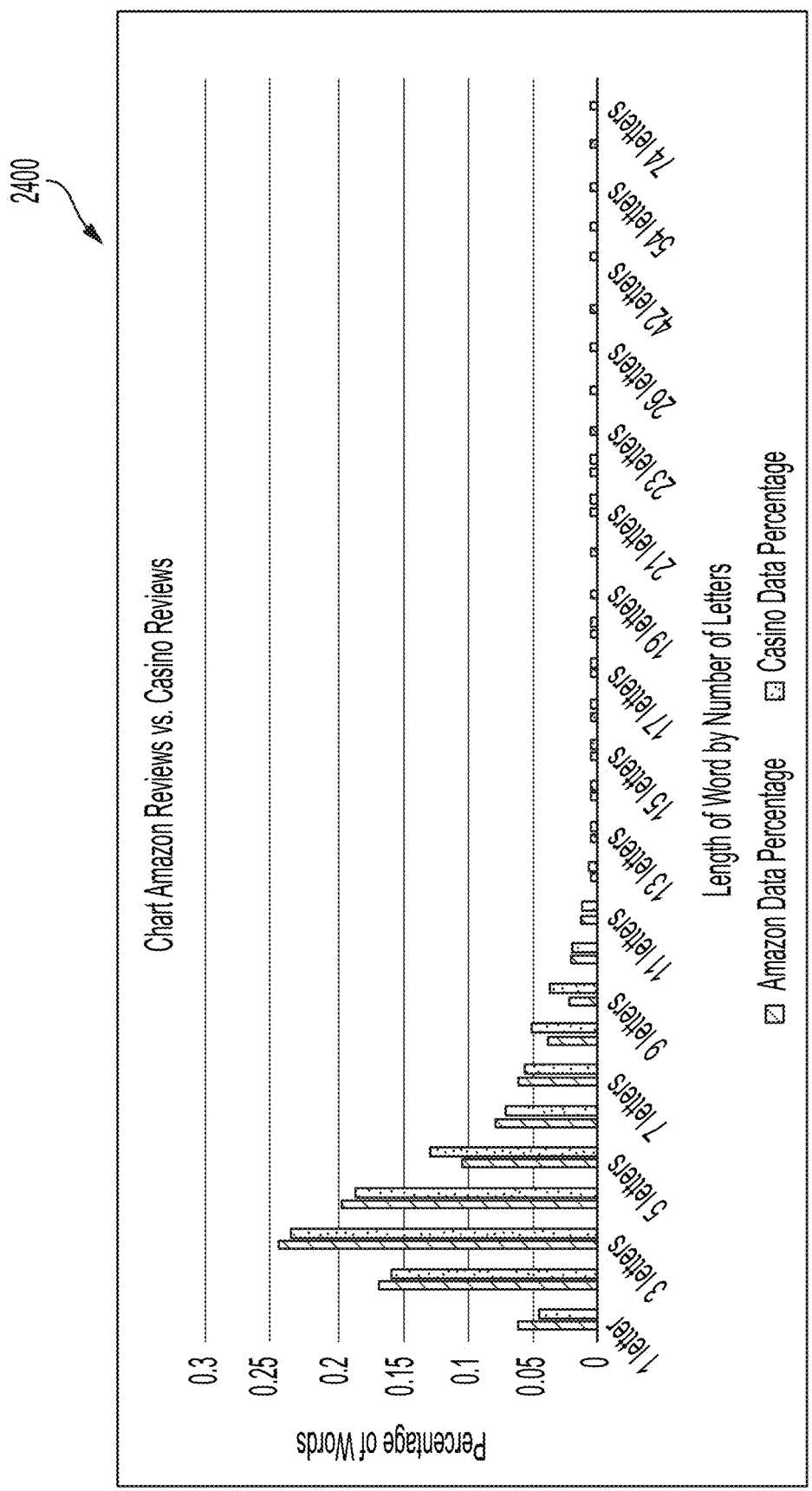
FIG. 24 is a histogram showing an example of normalized word-length metrics in relation to Amazon® and Casino datasets according to some aspects.

FIG. 23 shows an example of a histogram 2300 of raw counts associated with a word length metric in relation to the Casino and Amazon® datasets. An example of a histogram 2400 in which the raw counts of FIG. 23 are normalized using percentages is shown in FIG. 24. Comparing the two histograms, the size of the bars is slightly different between the two but the overall shapes are similar. Normalizing the metric values may therefore impact the sizes of the values, but the overall shapes and profiles relating to the metric values may remain the similar and therefore usable as a basis of comparison between datasets.

Figure 25:
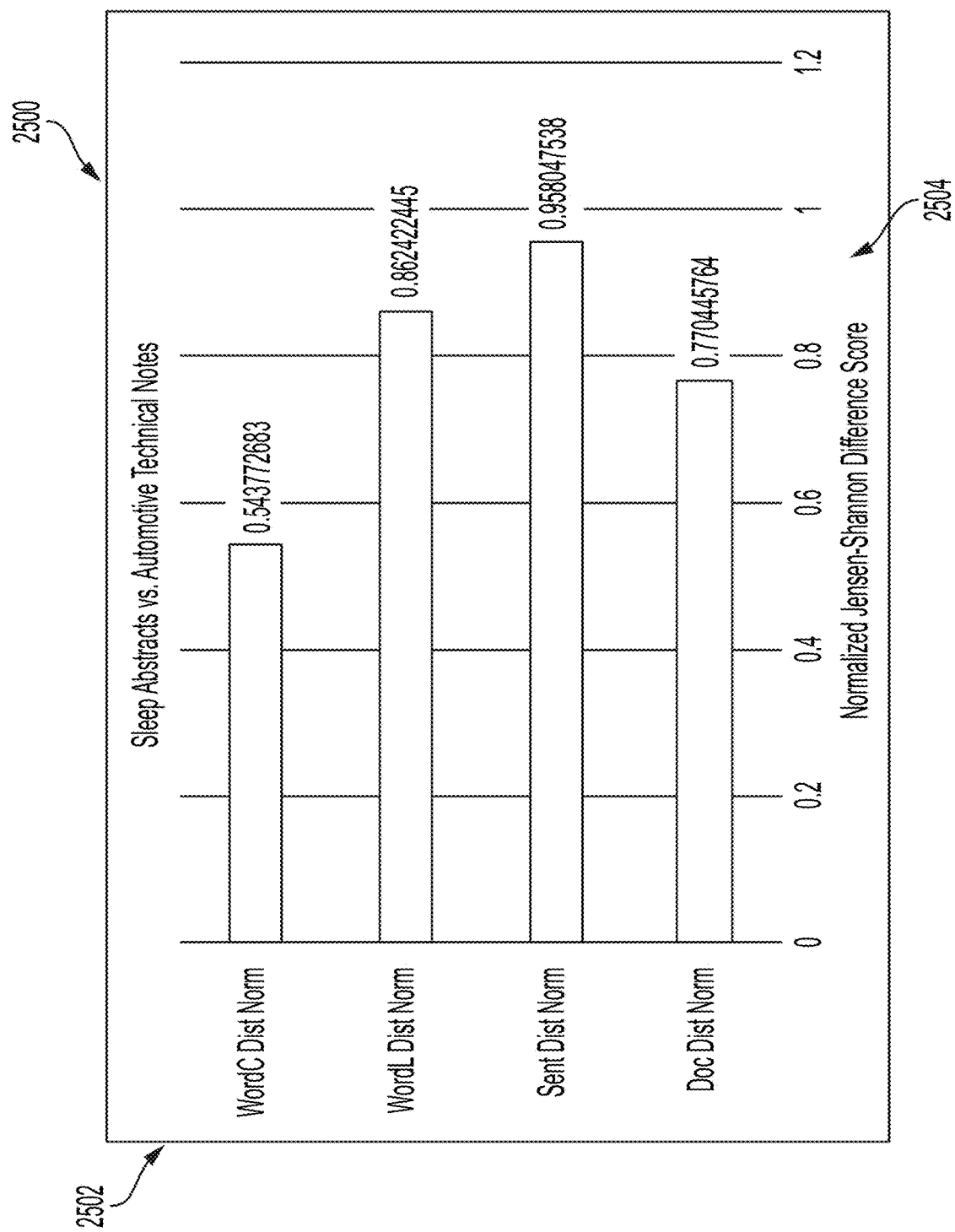
FIG. 25 is a chart showing an example of normalized JS difference scores associated with four metrics relating to sleep abstracts and automotive technical notes datasets according to some aspects.

Another example is shown in FIG. 25. In this figure, a bar chart 2500 is used to show a comparison between four different normalized metrics 1502 usable to determine similarities between two datasets, including sleep abstracts and automotive technical notes. The four different normalized metrics 2502 are listed along the Y-axis and include normalized word category difference (WordC Dist Norm), normalized word length difference (WordL Dist Norm), normalized sentence length difference (Sent Dist Norm), and normalized document length difference (Doc Dist Norm). The X-axis 2504 shows similarity scores. Note that the normalized word category difference is moderately different between the two datasets and the other three metrics basis are very different. This comparison result shows that it might be risky to use a model trained on automotive technical notes to analyze sleep abstracts, or vice versa.

Figure 26:
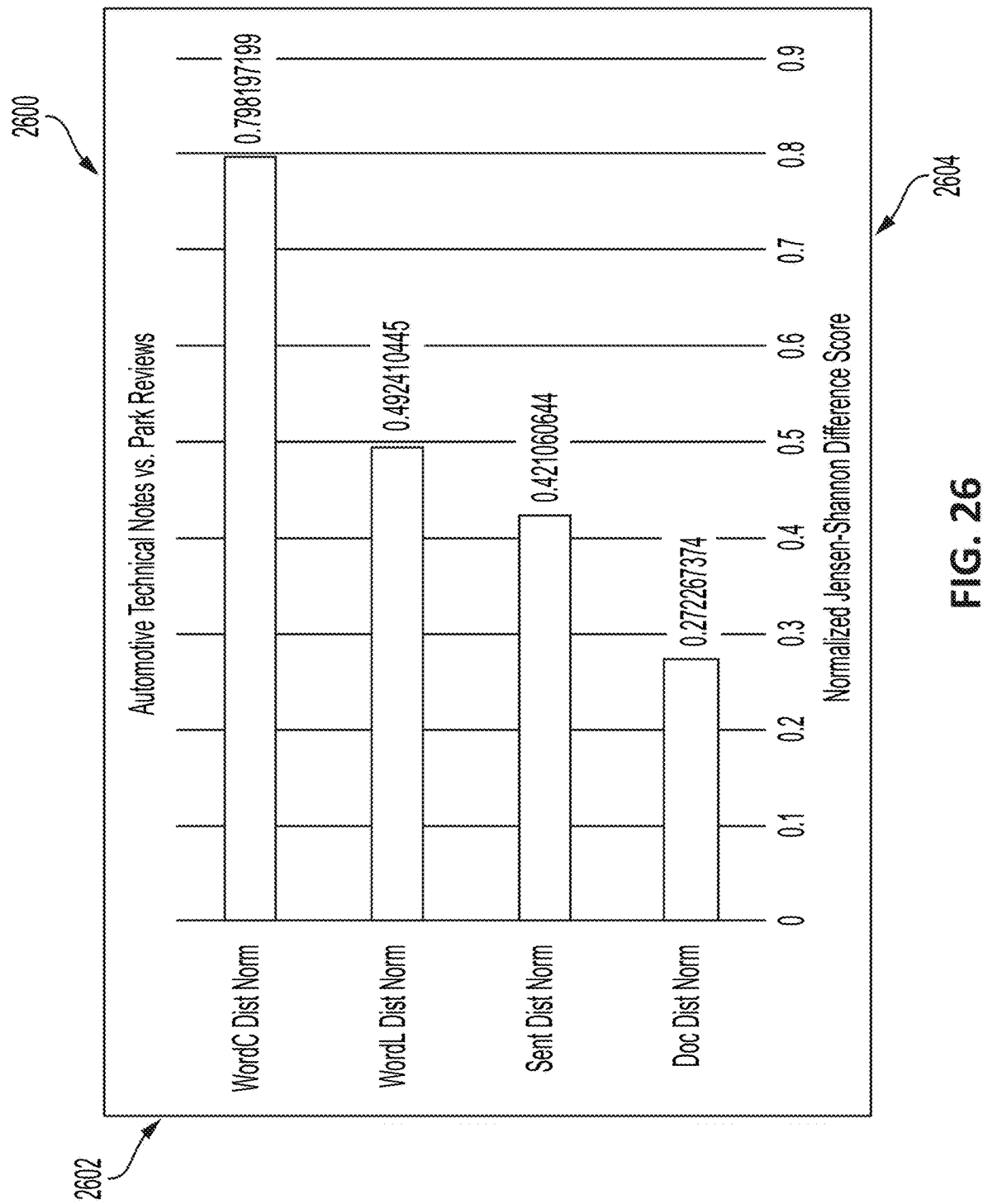
FIG. 26 is a chart showing an example of normalized JS difference scores associated with four metrics relating to automotive technical notes and park datasets according to some aspects.

Another example is shown in FIG. 26. In this figure, a bar chart 2600 is used to show a comparison between four different normalized metrics usable to determine similarities between two datasets, including automotive technical notes and park datasets. The four different normalized metrics 2602 are listed along the Y-axis and include normalized word category difference (WordC Dist Norm), normalized word length difference (WordL Dist Norm), normalized sentence length difference (Sent Dist Norm), and normalized document length difference (Doc Dist Norm). The X-axis 2604 shows similarity scores. In this comparison, the similarity score for the normalized word category metric is very different between the two datasets. This might indicate that the use of stop words is miserly compared with typical datasets, while the use of numeric words is a bit higher in the automotive technical notes.

In block 1308, the processor receives a selection of a model from the user via the graphical user interface. For example, the user may be able to select a specific model or model type from a list of candidates using a pulldown menu in the graphical user interface. Examples of the candidates can include a rules-based model such as the language-interpretation and text-interpretation (LITI) model by SAS Institute® of Cary, N.C.; a rule-based/hybrid model such as the categorization model by SAS Institute®; a recurrent neural network (RNN); a conditional random fields (CRF) model; a bidirectional encoder representations from transformers (BERT) model; or any combination of these. The processor can receive this selection for use in subsequent operations.

In block 1310, the processor can determine characteristics of the model (e.g., the specific model or model type) selected by the user. Examples of the characteristics can include a type of the model, a setting of the model, or a setting value of the model (e.g., a hyperparameter value of the model). In some examples, the processor can determine the characteristics by accessing a predefined database that includes relationships between models and their characteristics. Additionally or alternatively, the processor can determine the characteristics by accessing configuration information, such as configuration data stored in a configuration file, for the model. The configuration information may specify the characteristics. For example, the configuration information may specify the settings and setting values applied to the model.

In block 1312, the processor can generate one or more insights based on the similarity value and the characteristics of the model. In some examples, the similarity value and the characteristics of the model can be interpreted using one or more insight algorithms to produce some insights about how well the model may function if it is applied to the target textual dataset. The insight algorithms can rely on statistical measurements, the model type, the strengths/weaknesses of the model, the settings of the model, or any combination of these, to generate the one or more insights.

For example, if the similarity value is above a predefined threshold, such as 95% or 95 in a scale from 0 to 100, that means the target textual dataset may be relatively similar to the reference textual dataset in relation to the one or more corresponding types of metrics being compared (e.g., language formality, vocabulary diversity, information density, etc.). Given this similarity, it may be a reasonable conclusion that a model that operates relatively well on the reference textual dataset, or that was trained using the reference textual dataset, will likely operate similarly well on the target textual dataset. So, the processor can generate an insight indicating that the selected model will likely perform well on the target textual dataset.

When the similarity value indicates a significant difference between the target reference textual and the reference textual dataset, the processor then can further analyze the characteristics of the model to suggest how to use the model on the target textual dataset. For example, the processor can provide guidance on how to adjust the settings of the model to obtain optimal modeling results when the model is applied to the target textual dataset. Alternatively, the processor can recommend using an alternative type of model to achieve better (e.g., the best) modeling results. These processes are described in greater detail later on with respect to FIG. 19.

Some examples described herein can compute various metrics and combine them together to generate advice and strategies for model development, testing, or parameter settings. For example, two datasets (Corpus A and Corpus B) can be analyzed to compute various metrics. The following table lists metrics for Corpus B, which can form some or all of a textual profile for Corpus B. These metrics can then be assessed to determine the impact on model accuracy.

TABLE 2

Metrics and corresponding meanings and model impacts

| Type | Metric | Value | Metric Meaning | Model Impact |
|---|---|---|---|---|
| VD | Coverage-rank distribution | 0.63 | How varied the vocabulary is in the data | High |
| VD | Vocabulary overlap | 30% | How much overlap in vocabulary is there in the data | High |
| VD | Vocabulary difference | 0.49 | How different is the vocabulary in the data | High |
| ID | Word length distribution | 0.12 | What length of words appear in the data | Low |
| ID | Word type ratio | 0.30 | Content words vs. other types of words | Moderate |
| ID | Uniqueness ratio | 25% | How much duplication is present in the data | Moderate |
| LF | First person pronoun ratio | .05 | How much informality is present in the data | Low |
| LF | Unknown words ratio | .62 | How much error may be in data | High |
| IC | Tokens per sentence dist. | .12 | How much info per sentence | Low |
| IC | Sentences per doc dist. | .42 | How much info per document | Moderate |
| DS | Token type ratio | 30% | How likely to be domain specific | High |

In the above table, "VD" stands for vocabulary diversity, "ID" stands for information density, "LF" stands for language formality, and "DS" stands for document specificity. The impact of each metric's value on model accuracy is also shown. To determine each metric's accuracy impact, each metric's value may be compared against one or more corresponding thresholds. For example, the value for the coverage-rank distribution metric may be compared against two thresholds. If the coverage-rank distribution metric's is below a first threshold, it may have a low accuracy impact. If the coverage-rank distribution metric's is above the first threshold and below a second threshold, it may have a moderate accuracy impact. If the coverage-rank distribution metric's is above the second threshold, it may have a high accuracy impact. A similar process can be applied to the values of the other metrics listed in Table 2 to determine their accuracy impact, where each type of metric list in Table 2 may have its own designated threshold or thresholds. More than two thresholds may be used for a greater level of granularity. It will be appreciated that while Table 2 represents the impact as low, moderate, or high, other ways of indicating the model impact could also be used, such as numerical values or letter grades.

Still referring to Table 2, a possible interpretation of the textual profile for Corpus B is that the Corpus B is different from the source dataset (e.g., reference dataset) in a few important ways. First, the vocabulary is different, more varied, and does not overlap much with the source corpus. Second, the probability that this is a domain-specific dataset is high based on the token-type ratio, number of unknown words (with lack of indicators of informality), and the amount of vocabulary overlap. There are also some moderate differences in lengths of document and use of content words and duplication rate. Overall, the likelihood is high that the model will need some tuning to avoid a substantial loss of accuracy. In this example, the system could provide advice to the user, such as to seek a corpus in the same domain or leverage the non-overlapping terms list to seek new training data to use the further tune the model. Additionally, the user could be advised to subdivide the target corpus to identify heterogeneous parts that should be evaluated separately during the tuning of the new model.

In block 1314, the processor can output the one or more insights in the graphical user interface. The insights may take the form of recommendations, tips, comparisons, and/or guidance to assist the user in improving modeling results. In some examples, the processor can output the insights as graphs or charts in the graphical user interface. Additionally or alternatively, the processor can provide the insights using templates or a natural-language generation processes through which the insights can be provided in a human-language format to help the user better understand the insights. For example, the system can have a predefined set of templates, where each template can include a series of sentences with blank fields that are filled in by the processor to generate an insight. As another example, the system can include a natural-language generation model through which sentences can be generated in a human-readable and digestible format based on a set of inputs. The insight can indicate that the user should select an alternative model, adjust settings of the model, test the model, preprocess the target textual dataset, or any combination of these.

Figure 14:
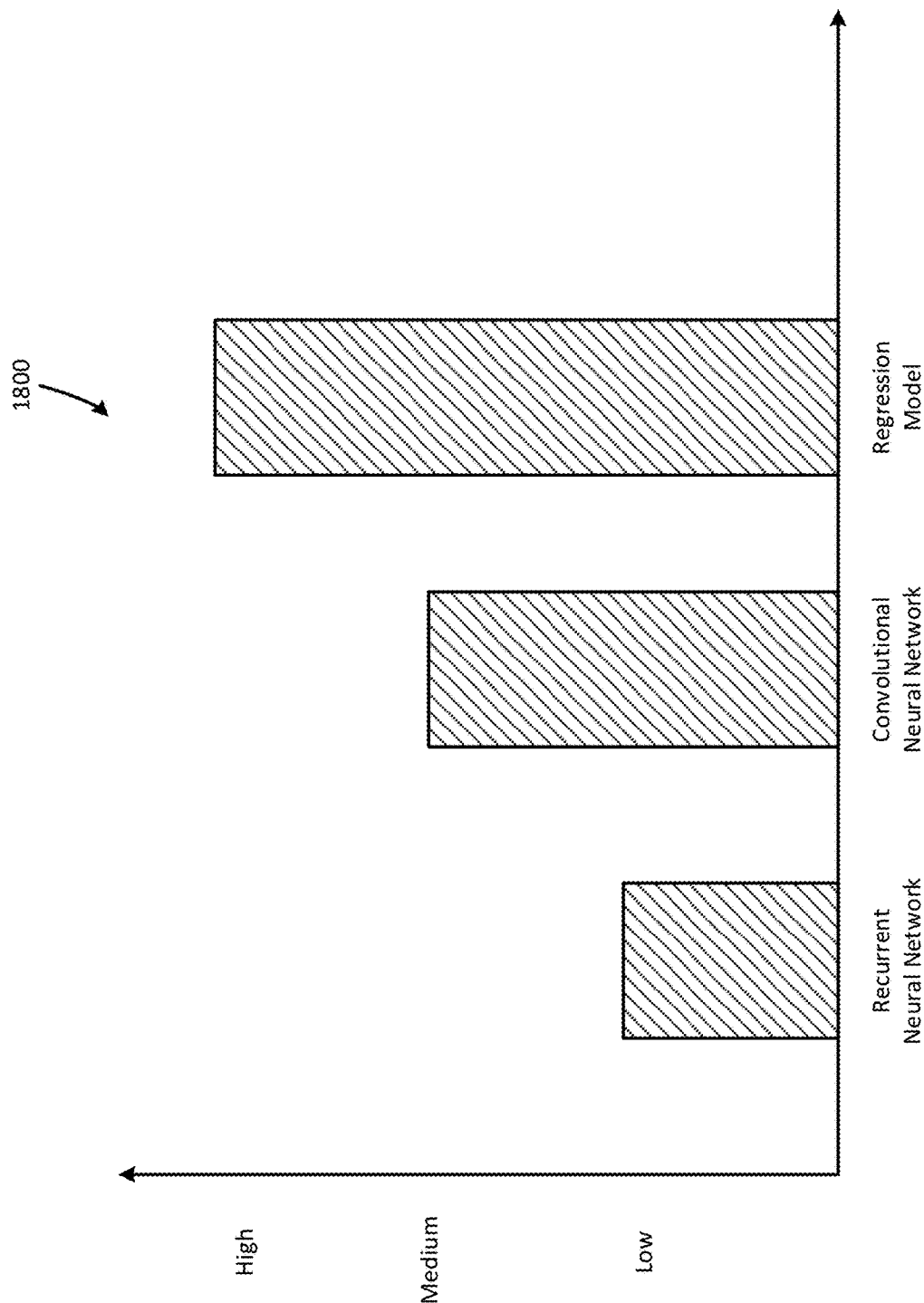
FIG. 14 depicts an example of a bar chart showing anticipated accuracy degradation associated with different types of models according to some aspects.

In some examples, a user can select various models (e.g., specific models or model types) through the graphical user interface and run the above processes to learn how the various models would perform on the target textual dataset. The processor can determine insights about how each model would perform on the target textual dataset and output the insights in the graphical user interface. In some cases, the insights may be presented in the form of an anticipated reduction in accuracy. One example of the graphical user interface with such insights is shown in FIG. 14. The graphical user interface includes a bar chart 1800 indicating the predicted reduction in accuracy for different types of models when the model types are applied to the target textual dataset. Along the Y-axis, "high" indicates more accuracy degradation than "low." The user may review the insights and, in response to the insights, select a different model type or reconfigure their existing model type (e.g., update its parameters or settings) to obtain more accurate results.

As noted above, the target textual dataset and the reference textual dataset can be analyzed to generate a respective set of metrics for each dataset. There may be many categories (e.g., classes) of metrics capable of being determined. FIG. 15 depicts an example of categories of metrics according to some aspects. Each category of metrics can contain one or more metrics. These are represented in box 1506 using the nomenclature (category, metric number), where for example (C1, M1) represents metric 1 in category 1. Examples of the categories of metrics can include information complexity, vocabulary diversity, information density, language formality, and domain specificity. The processor can compute the metrics in these categories by parsing through documents in the textual datasets and aggregating counts of the metric values. These categories will now be described in greater detail.

The information complexity category can indicate how much information is packed into documents and sentences. Within the category of information complexity can be several types of metrics that can be determined by the processor. Examples of those metrics can include the total number of sentences in the textual dataset, the average number of tokens per sentence, the minimum number of tokens per sentence, the maximum number of tokens per sentence, the peak tokens per sentence, the total number of documents in the corpus, the average number of sentences per document, the minimum number of sentences per document, and the maximum number of sentences per document.

Information complexity can be used to characterize the amount of information in each document, sentence, or clause, thereby characterizing the information load. Some examples can focus on information represented by the number of tokens per sentence or clause, the number of clauses per sentence, the depth of clauses per sentence, the number of sentences per documents, etc. While other research has used some of these metrics, none has used them to characterize a data set's complexity or to compare multiple datasets to one another. Some examples of metrics that fall within the category of information complexity are described below and can be obtained in multiple ways or in a combination of ways, including:

Statistics related to the number of tokens per sentence or clause can be leveraged to compare the distributions between data sets using a Jensen-Shannon difference/divergence score or another similarity metric described above.

The proportion of sentences with n number of clauses can be categorized and the distributions can be compared using a similarity metric (e.g., Jensen-Shannon). The more clauses in a sentence, the more complex it is.

The proportions of sentences with a clause depth of one, two, three or more can be determined and used to indicate the complexity within sentences. Sentences with deeper relationships between clauses may be more difficult to understand and hold more complex information. In some examples, the comparison may performed in a way that is similar to the token-type proportions mentioned above (e.g., Jensen-Shannon).

The number of sentences per document may also be an important indication of the shape of the dataset. Categorizing documents by their sentence number can create a distribution that can then be compared through similarity metrics like Jensen-Shannon.

Other counts related to the structure of a document could also be applied here, such as the number of paragraphs, the number of titles, the number of chapters, the number of sections, etc.

Another category of linguistic information that can ascertained for a given textual dataset can be vocabulary diversity. The vocabulary diversity category can indicate "lexical richness" in the textual dataset, such as the breadth of vocabulary and the amount of content words versus other types of tokens in the textual dataset. The more unique words the textual dataset has, the more diverse the textual dataset is in terms of topics. Within the category of vocabulary diversity can be several types of metrics that can be determined by the processor. Examples of those metrics can include the total number of unique tokens (forms) in the textual dataset, the total number of punctuation tokens in the textual dataset, the total number of unique tokens that account for at least 80% of the data (e.g., a coverage metric), and the total number of content words in the textual dataset.

Vocabulary diversity can be used to characterize the scope of the vocabulary and compare the datasets to one another. Some examples can focus on content through word (type or form) frequency and distribution comparisons, term-type ratios, vocabulary overlap, topic overlap, word repetition or concentration, word sophistication, etc. Some examples of metrics that fall within the category of vocabulary diversity are described below and can be obtained in multiple ways or in a combination of ways, including:

Following the coverage-rank distribution plot approach of Nemeth and Zainko (2002) to represent the vocabulary of a dataset in a way that can offset the difference in the size of multiple datasets, so the representations can be compared.

A simpler way to measuring coverage that does not account for the size of the dataset, by graphing the cumulative percentage coverage from most-frequent word form to least-frequent word form. This enables identification of where the vocabulary covers a significant portion (80%) of the data.

Use of token-type ratios, leveraging the work by Temnikova et. al. (2013), as a metric.

Determining a proportion of the terms in corpus B (the target dataset) that overlap with corpus A (the reference dataset).

Evaluating distance between vocabulary through embeddings, leveraging the work of Asgari et. al. (2016) to characterize the distance between corpora using a joint similarity distribution of words and calculating a Jensen-Shannon divergence (or difference) between unified similarity distributions of the datasets.

Leverage the chi-square approach of Babych et. al. (2014) to compare vocabularies between two datasets. They were using the comparison to select parallel corpora. This approach was also used by Fothergill et. al. (2016) to compare a web corpus to a reference corpus, but was the only metric they applied.

Leverage the methodology proposed by Kilgarrif (2001), who compared chi-square and Spearman rank correlation for comparing datasets based on vocabulary alone. This is the only metric Kilgarrif used to make comparisons.

Leverage the Euclidean distance metric studied by Piperski (2018).

Compare n-gram model perplexity from one dataset to another using the approach described by Campos et. al. (2020). They were using the approach to compare historical varieties of a language or different languages for purposes of linguistic research.

Compare corpora based on word unigram frequencies or character trigram frequencies leveraging the Spearman frequency-based similarity measures used by Dunn (2021). He was using this to answer the question of representativeness of a language variety by different data sources to validate the use of such data in linguistic research.

Measure word repetition rates like mean segmental type-token ratio or measure of textual lexical diversity (related metrics) using the approach represented by Jarvis (2013). His focus was on measuring language proficiency.

Measuring concentration of categories within the population, where terms are treated as categories using Yule's index or the Gini-Simpson index.

Use cosine similarities based on the ranking lists of word termhood, as described in the research by Liu et. al (2012), who were interested in comparing corpora for the purpose of bilingual terminology extraction.

Use any of the methods described above on bigrams or trigrams to account for context of terms.

Extend the methods described above to topics as well as terms to determine the distance between the datasets by comparing their topics.

Measure vocabulary sophistication by scoring terms based upon their frequency (in general datasets), range across the data set (more sophisticated terms tend to appear in fewer documents), and age of exposure rating or contextual distinctiveness (semantic ambiguity) as described in Kyle et. al. (2017). Their work focused on analyzing how advanced and fluent a written text is based on vocabulary, not on comparison of datasets.

Another category of linguistic information that can ascertained for a given textual dataset can be information density. The information density category can be measured by the length of the words and proportion of content words. The longer the words and the higher proportion of content words in the textual dataset, the higher the information density in the textual dataset. Within the category of information density can be several types of metrics that can be determined by the processor. Examples of those metrics can include the average length of words in the textual dataset, the minimum length of the words in the textual dataset, the maximum length of the words in the textual dataset, the word length with the highest frequency (i.e., that occurs the most amount of times) in the textual dataset, the number of unique words having each word length, and the number of words with the maximum word length.

Information density can be used to characterize the amount of information that the words represent and compare the data sets to one another. Some example can focus on information represented by word length, word type, and perhaps metrics that highlight the specificity or sophistication of particular words. In addition to words, some examples can identify duplication across documents, for example by leveraging the approach of Baisa (2013) to distinguish repeated data from new data, or other methods may be used to identify the proportion of repeated data. Metrics related to information density have not been a focus of prior research for the purpose of comparing textual datasets. The prior research in this area has focused mainly on the readability of specific texts. Some examples of metrics that fall within the category of information density are described below and can be obtained in multiple ways or in a combination of ways, including:

Comparing the distributions of word length in the datasets by leveraging a similarity metric like Jensen-Shannon or chi-square. Other possible similarity metrics include Euclidean distance, Manhattan distance, Cosine distance, Chi-square, Spearman's rho, nearest neighbor vocabulary or topic comparisons, and Jaccard similarity calculation. The result can represent word length difference between the datasets.

Comparing the distributions of the ratios of word type across data sets through a similarity metric like Jensen-Shannon (or one of the others mentioned above).

Comparing the distributions of the more or less specific/sophisticated words in a similar manner.

Identifying the proportion of the data set that is duplicate data, for example by using an n-gram approach like the one used by Baisa (2013), to identify and count duplication. The datasets can then be compared by using a similarity metric comparing the proportions.

Another category of linguistic information that can ascertained for a given textual dataset can be language formality. A higher proportion of first-person pronouns in the textual dataset as compared with the total number of stop words, the more informal the textual dataset is inclined to be. Within the category of language formality can be several types of metrics that can be determined by the processor. Examples of those metrics can include a ratio of first-person pronouns to the total number of stop words in the textual dataset.

Language formality can be used to characterize the patterns of standard writing conventions, use of formal or informal constructions or vocabulary, and potential errors in the data. Markers of formal or informal writing that can be measured include pronoun usage, contractions, slang, constructions like phrasal verbs and other grammatical patterns of informal or formal use like passive verbs, use of uppercase and lowercase letters, proportion of punctuation tokens, proportion of spelling errors or unknown words, genre characterization, etc. Some examples of metrics that fall within the category of language formality are described below and can be obtained in multiple ways or a combination of ways, including:

A proportion of the stop words that fit into specific categories of formality, such as contractions or first or second person pronouns. Chi-square or other similarity metric could be used to compare across datasets.

Categorization of documents into genres and tracking of the proportion of each genre across the data set. Comparisons of the distributions of the genres across data sets might leverage Jensen-Shannon differences/divergences or another similarity metric.

Use of grammatical constructions that are markers of formality for a given language, such as passive verbs or phrasal verbs in English. This could be measured as a proportion of verbs in the data set or compared to more formal constructions to general a metric of grammatical formality. Comparing corpora could use one of the similarity metrics (e.g., Jensen-Shannon) listed above.

A proportion of lowercase letters and uppercase letters can be compared against a baseline metric of expected proportions for formal writing styles or compared to one another using similarity metrics (e.g., Jensen-Shannon) to determine similarity of styles.

Identification of the proportion of misspellings or unknown words compared to a dictionary can also provide indications of the formality of the writing style. Again, this metric can be compared to a typical baseline or similarity metrics can be used to depict similarity (e.g., Jensen-Shannon).

Identification of slang words can also be used in combination with the misspellings/unknown word calculations or separately. A higher proportion of slang words can indicate lower levels of formality. Similarity metrics (e.g., Jensen-Shannon) can be applied to compare corpora.

A proportion of punctuation can indicate usage of punctuation. Tracking the distribution of punctuation through the data can also be an indicator of standard vs. nonstandard use of punctuation. Sun et. al. (2019) mentioned using punctuation distributions to characterize English usage, but not to compare datasets. These metrics can also be compared to a standard or a range, and can additionally be compared across corpora with similarity metrics (e.g., Jensen-Shannon).

Another category of linguistic information that can ascertained for a given textual dataset can be domain specificity. The domain specificity category can indicate whether the textual dataset relates to a specific domain or is more general in nature. Within the category of domain specificity can be several types of metrics that can be determined by the processor. One type of metric can be term-specificity ratio, which can be computed by taking the ratio of domain-specific terms to the full set of terms in the corpus to determine the relative domain specificity or information density of a corpus. The number of domain-specific terms may be determined using term frequency or relative standard deviation.

Domain specificity can be used to characterize how much the language and grammar of the dataset aligns to a general profile of the language versus a more specialized profile of the language, or how close two datasets align with respect to domain. It can be useful if the comparison dataset (e.g., reference dataset) is either a general representation of the language or is a domain-specific representation of the language in the same domain as the target dataset. Some examples focus on the vocabulary represented in the datasets and on the grammatical patterns that are known to represent domain-specific writing styles in each language of interest based on linguistic research into the grammatical patterns of various genres. These metrics are likely to reflect some of the metrics used above to compare vocabulary sets across corpora (vocabulary diversity) or to compare grammatical pattern usage (language formality). Some examples can use grammar to compare corpora to identify if they are in the same domain or a general domain. Some examples of metrics that fall within the category of domain specificity are described below and can be obtained in multiple ways or in a combination of ways, including:

- Listing the terms in each data set with a common threshold for frequency (likely 3-4) and then determining the proportion of overlap between the data sets. The more overlap, the more likely the two datasets are from the same or a similar domain.
- Listing the terms in the target dataset that do not overlap with the reference/source dataset, so that the user can leverage that list to find new data to tune the model. This may leverage the approach used by Quero (2017).
- The types of comparisons used in the vocabulary similarity computations described above can be used to determine how similar the vocabulary is across the two datasets. This same approach can leverage topics instead of terms to compare the datasets.
- The research by Temnikova et. al. (2013) could be leveraged to characterize datasets as domain-specific or not. That research focused on token-type ratios, word-POS ratios, and vocabulary comparisons.
- Use of grammatical constructions that are markers of domain-specific language, such as limited or repeated constructions, could be used. This could be measured as a comparison of structures found in a more general dataset compared with structure in the target dataset. Dependency parse trees or n-grams of part-of-speech tags could serve to represent the patterns and structures. Proportions of constructions would be used in comparing corpora leveraging one of the similarity metrics (e.g., Jensen-Shannon) listed above.
- Use of a dictionary approach can also help to determine the number of unknown words in the dataset. When combined with the metrics of formality, we can determine if the unknown word count is due to errors like misspellings or due to specialized terminology used in a domain.

It will be appreciated that the above examples of categories and the metrics therein are intended to be illustrative and non-limiting. Other examples may include more, fewer, or different categories than those described above. And other examples may include more, fewer, or different metrics in each category than those described above.

Figure 16:
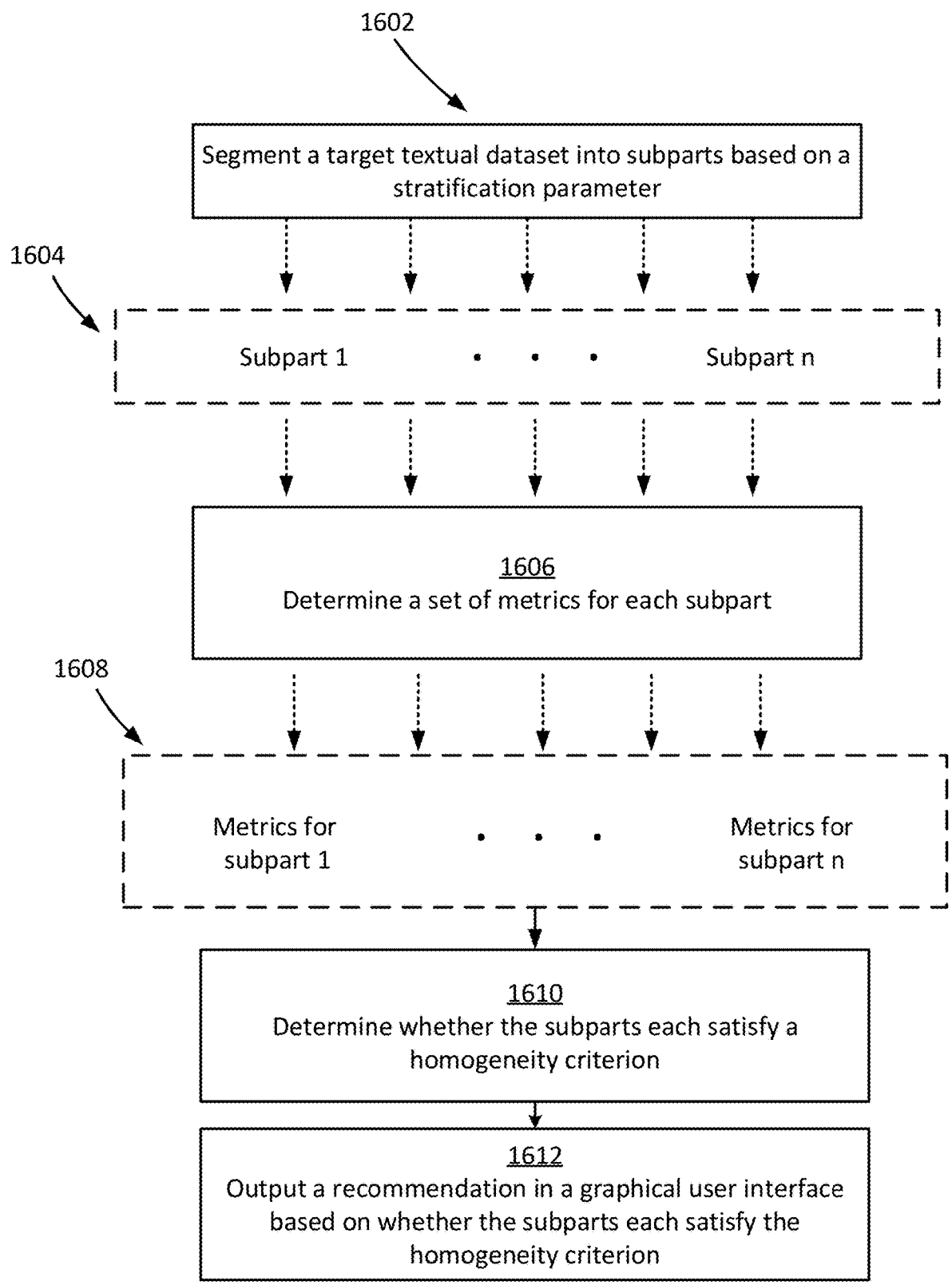
FIG. 16 is a flow chart of an example of a process for determining whether a target textual dataset is relatively homogenous according to some aspects.

In some example, the processor can test the target textual dataset for homogeneity. In general, it can be desirable for the target textual dataset to be relatively homogeneous so that the model has a consistent level of accuracy across the entire target textual dataset. If the target textual dataset is not sufficiently homogeneous, the model may perform better on some aspects of the target textual dataset than on other aspects of the target textual dataset, undermining the modeling results. To flag this potential issue for the end user, in some examples the processor can test the target textual dataset for homogeneity and output results of the test to the user. One example of a process for testing the homogeneity of the target dataset is described below with reference to FIG. 16.

In block 1602, the processor can segment the target textual dataset into a set of subparts, as shown in box 1604. The processor can perform this segmentation based on a stratification parameter. Examples of the stratification parameter can include date, time, genre, domain, language, etc. In some examples, the stratification parameter may be bias related (e.g., a stratification parameter for which there is a known inherent bias). Examples of such bias-related stratification parameters can include gender, race, ability, etc. The stratification parameter may be chosen by a user (e.g., via the graphical user interface) or may be a default parameter. One of example of choosing stratification parameter via the graphical user interface may involve selecting a checkbox or an item from a pull-down menu indicating the desired stratification parameter.

In block 1606, the processor analyzes each subpart to determine a set of metrics for each subpart. The sets of metrics are shown in box 1608 of FIG. 16. The processor can use any of the techniques described above to determine the set of metrics for a given subpart, and the sets of metrics can each include any number and combination of the metrics described above. In some example, the processor can determine the set of metrics for a given subpart based on the chosen stratification parameter In step 1610, the processor determines whether each of the subparts of the target textual dataset satisfies a homogeneity criterion. A subpart may satisfy the homogeneity criterion when the subpart is sufficiently similar to at least one other subpart such that the subparts may be considered relatively homogenous. To determine whether a particular subpart is sufficiently similar to the at least one other subpart, the processor can compare the metrics for the particular subpart to the metrics for the at least one other subpart to generate one or more similarity values. This may be similar to the process described above with respect to block 1306 of FIG. 13. In this context, a similarity value may represent how similar two subparts are to one another. A higher similarity value may indicate a relatively high level of similarity, which may mean that the two subparts are relatively homogenous. A lower similarity value may indicate a relatively lower level of similarity, which may mean that the two subparts are relatively heterogeneous. After determining the one or more similarity values, the processor can compare the one or more similarity values to one or more predefined thresholds. If the one or more similarity values meet or exceed the one or more predefined thresholds, the processor can determine that the subpart satisfies the homogeneity criterion.

In step 1612, the processor outputs a recommendation in the graphical user interface based on whether the subparts satisfy the homogeneity criterion. If one or more of the subparts do not satisfy the homogeneity criterion, then the target textual dataset as a whole may be considered insufficiently homogenous. So, the processor can generate a recommendation in the graphical user interface suggesting that the set of subparts be analyzed separately from one another using one or more models. For example, the processor can flag two or more non-homogeneous subparts of the target textual dataset in the graphical user interface to assist the user in selecting proper models. If most (e.g., all) of the subparts satisfy the homogeneity criterion, then the target textual dataset can be considered as a whole to be sufficiently homogenous. So, the processor can generate another recommendation in the graphical user interface suggesting that the target textual dataset be analyzed as a whole using the model.

In some examples, insights can be generated based each subpart of the target textual dataset. If there are no major differences between each subpart of the target textual dataset, then an insight could be that the target textual dataset is homogeneous. If there are major differences between subparts of the target textual dataset, then an insight can be that the target textual dataset is not homogeneous. The system can thus advise user to apply different models to two or more of the subparts, where the model recommended for each subpart can be selected to optimize modeling results for that subpart, to achieve an overall improvement to the modeling results.

Figure 17:
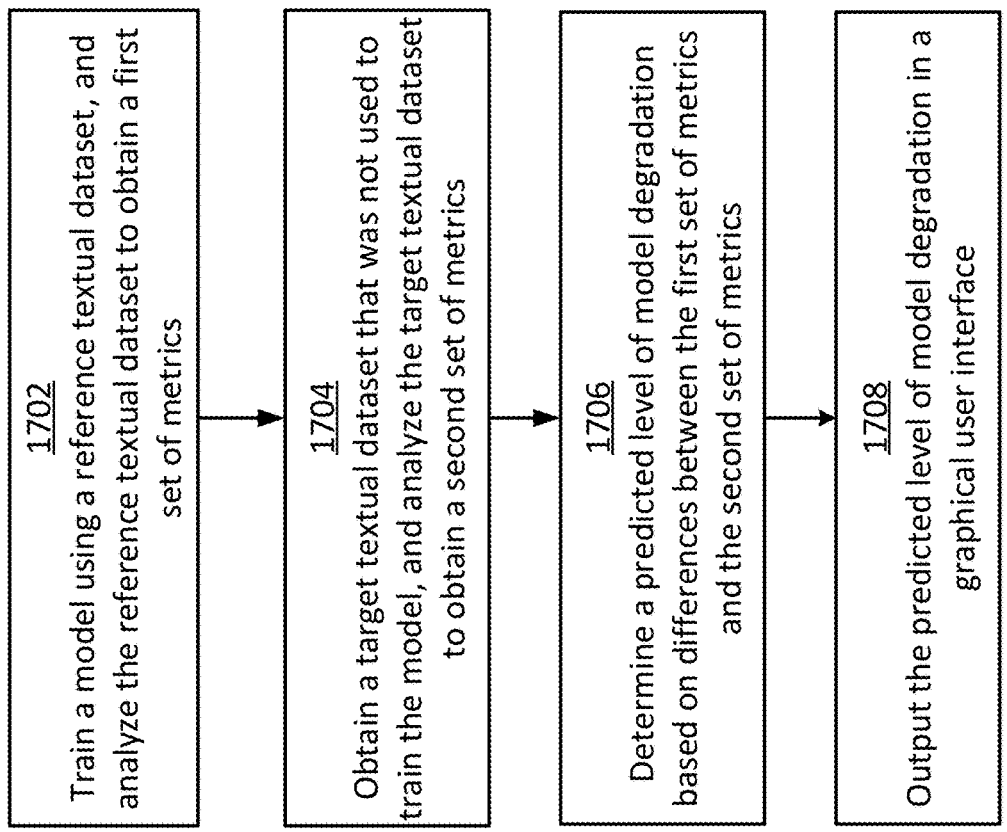
FIG. 17 is a flow chart of an example of a process for determining a predicted level of model degradation based on differences between a first set of metrics and a second set of metrics according to some aspects.

In some examples, the reference textual dataset described above may serve as training data used to train the selected model, before the selected model is applied to the target textual dataset. In such circumstances, the process of FIG. 17 may be implemented. That process will now be described below.

In block 1702, the processor trains a model using a reference textual dataset. An example of the model can be a machine-learning model, such as a neural network. After training the model, the processor can analyze the reference textual data to obtain a first set of metrics. This operation can be performed similarly to operation 1302 of FIG. 13.

In block 1704, the processor obtains (e.g., receives) a target textual dataset that was not used to train the model. After obtaining the target textual dataset, the processor can analyze the target textual data to obtain a second set of metrics. This operation can be performed similarly to operation 1304 of FIG. 13.

In block 1706, the processor determines a predicted level of degradation based on differences between the first set of metrics and the second set of metrics. The predicted level of degradation can signify the risk of accuracy degradation if the model (that was trained using the reference textual dataset) is applied to the target textual dataset. When the difference between the first set of metrics and the second set of metrics is significant, the level of accuracy degradation may also be significant. The processor can determine the predicted level of degradation based on the difference and provide the predicted level of degradation to the user so as to warn the user about the possible degradation.

As one example, the processor can determine one or more similarity values between the first set of metrics and the second set of metrics using any of the techniques described above. Based on the one or more similarity values, the processor can then determine the predicted level of degradation. The processor may determine the predicted level of degradation using a predefined lookup table or one or more algorithms. For example, the similarity values can indicate a high level of similarity (e.g., greater than 90% similarity) between two compared metrics. So, the processor can access a predefined lookup table that maps the similarity level to a predicted level of generation. Using such a lookup table, the processor may determine that the predicted level of degradation is "low." If the similarity values indicate a medium level of similarity (e.g., greater than 80% similarity) between two compared metrics, then the processor can use the lookup table to determine that the predicted level of degradation is "medium." If the similarity values indicate a low level of similarity (e.g., less than 80% similarity) between two compared metrics, then the processor can use the lookup table to determine that the predicted level of degradation is "high." The processor may take any number and combination of similarity values corresponding to any number and combination of metrics into account to determine the predicted level of degradation.

In block 1708, the processor outputs the predicted level of model degradation in a graphical user interface. For example, the processor may output a numerical value (e.g., 20%) representing the predicted level of model degradation in the graphical user interface. As another example, the processor may output a text representation of the predicted level of model degradation. For instance, the processor may output "high," "medium," or "low" depending how much degradation is predicted to occur, where "high" signifies more accuracy degradation than "low."

One specific example can involve determining how well Model A that was trained on a reference textual dataset (e.g., Corpus A) will work on the target textual dataset (e.g., Corpus B). This process can begin by determining how homogeneous the reference textual dataset is and how homogeneous the target textual dataset is. Then the processes described above can be used to determine how different the reference textual dataset is from the target textual dataset. If the target textual dataset has long sentences and long words, it may be domain specific. If the target textual dataset has short sentences and short words, it may be informal or transcribed speech data. If the target textual dataset has misspellings and short sentences or few sentences, it may be informal data. If the target textual dataset has different vocabulary and terms from the reference textual dataset, than the robustness of the model on the target textual dataset may be lower. So, it may be desirable to adjust the model type or model settings. Alternatively, the model may need to be retrained or tuned for the target textual dataset.

In some example, the processor can suggest a model that may reduce resource consumption or have improved accuracy as compared to the model selected by the user. For example, the user may select a deep learning model for use on the target textual dataset. But if the target textual dataset is relatively simple (e.g., in terms of linguistic variability), a deep learning model may be overkill. In such situations, the processor may determine and recommend an alternative model that can result in better accuracy, maintainability, or performance (e.g., reduced processing speeds and/or memory usage). Examples of such a process are described in greater detail below with respect to FIG. 19.

Figure 18:
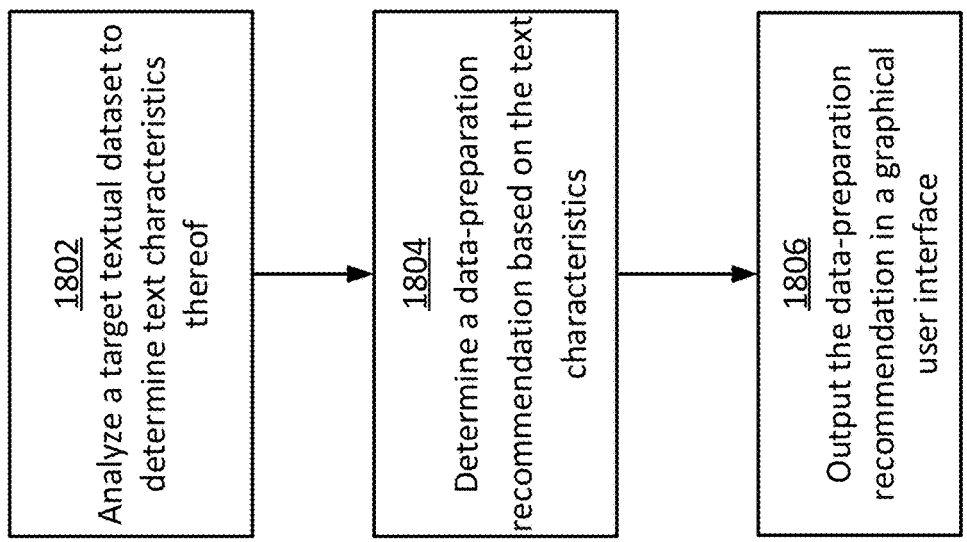
FIG. 18 is a flow chart of an example of a process for generating a data-preparation recommendation according to some aspects.

In some examples, the processor can also determine whether the target textual dataset should be preprocessed (e.g., further preprocessed) prior to the selected model being applied to the target textual dataset. If so, the processor can output a recommendation that one or more data-preparation operations be applied to the target textual dataset. A data-preparation operation can be a preprocessing operation configured to be applied to the target textual dataset for transforming at least one aspect of the target textual dataset in a way that makes it more optimized for (e.g., compatible with) the selected model. In general, the data-preparation operations may involve normalizing the target textual dataset, removing one or more subparts from the target textual dataset, reformatting the target textual dataset from a first format to a second format, or any combination of these. One example of a process for determining whether the target textual dataset should be preprocessed will now be described below with reference to FIG. 18.

In block 1802, the processor analyzes a target textual dataset to determine text characteristics thereof. For example, the processor can determine sentence lengths in the target textual dataset, word spellings in the target textual dataset, lengths of documents in the target textual dataset, or any combination of these. Additionally or alternatively, the processor can determine any of the other metrics described herein, which can indicate the text characteristics of the target textual dataset.

In block 1804, the processor determines one or more data-preparation recommendations based on the text characteristics (e.g., the metrics). By analyzing the text characteristics, a data-preparation recommendation can be generated to indicate whether the target textual dataset should be preprocessed in a particular way. The data-preparation recommendation can specify one or more data-preparation operations to apply to the target textual dataset to improve the model's results.

One example of a data-preparation operation can include removing extremely long sentences (e.g., sentences with a number of words or characters that exceeds a predefined threshold) in documents. The processor can identify such long sentences by parsing through the sentences in the target textual dataset and computing their lengths. It may be desirable to remove extremely long sentences, since those sentences is not really contain substantive content, but rather may be programming code, spreadsheets, or other undesirable text. Another example of a data-preparation operation can include removing the text that contains many misspelled words from the target textual dataset, since a large number of misspellings may indicate that the texts is informal, which may not be as easy to process by a model as more formal text. Many misspellings or unknown words may also mean that there is non-text data, which is suboptimal for many models. The processor can identify such misspellings and unknown words by parsing through the words in the target textual dataset and comparing them to known words in a library. Still another example of a data-preparation operation can include correcting the misspelled words in the target textual dataset to improve accuracy when the model is applied. Of course, these data-preparation operations are intended to be illustrative and non-limiting. Other examples may include more, fewer, or different types of data-preparation operations.

In block 1806, the processor outputs the data-preparation recommendation in a graphical user interface. For example, the processor can provide output a warning to the user in the graphical user interface indicating that that target textual dataset should be preprocessed before the selected model is applied. The processor may also output the one or more recommended data-preparation operations.

Figure 19:
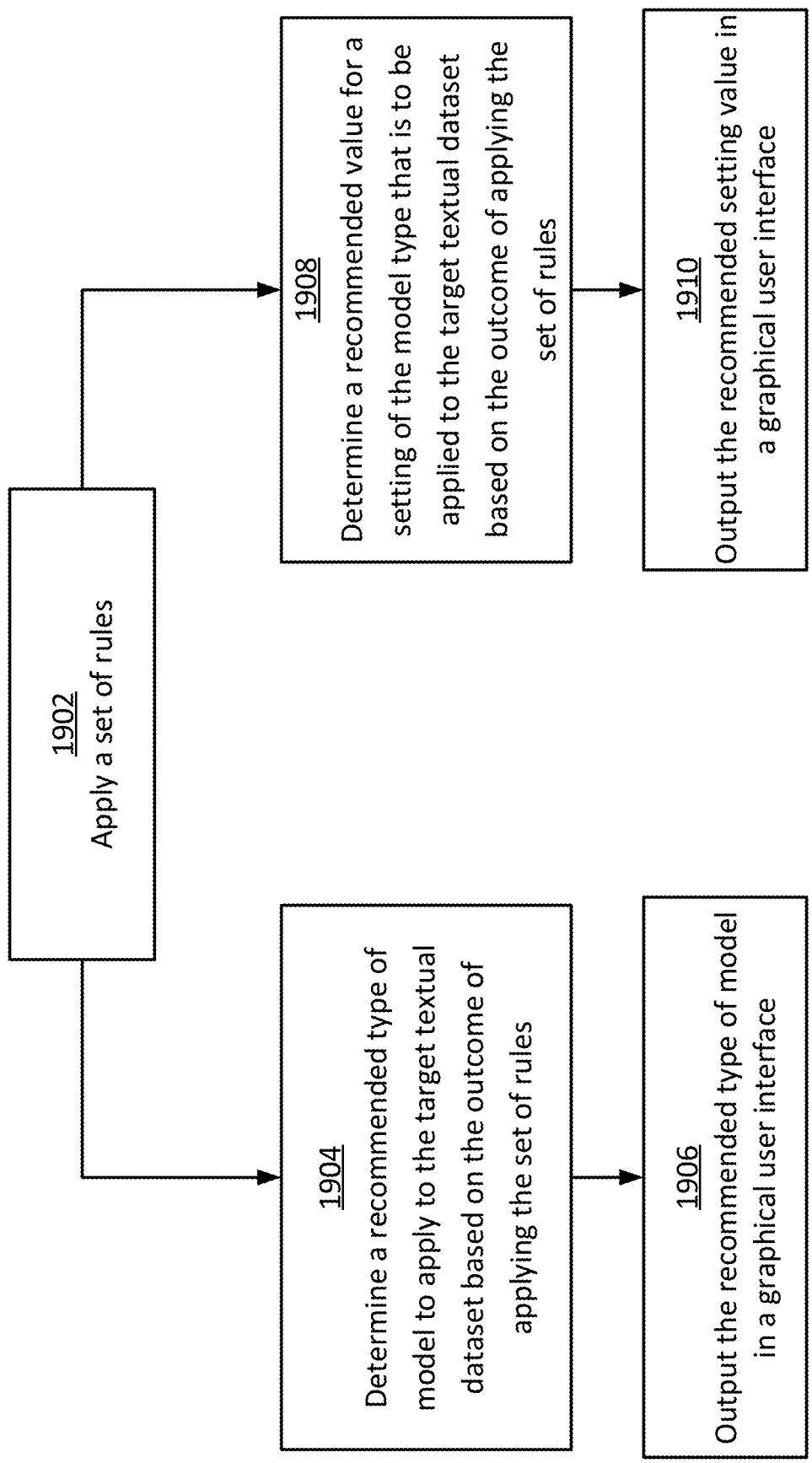
FIG. 19 is a flow chart of an example of a process for determining a recommended type of model and a recommended setting value for a model according to some aspects.

In some examples, the processor can determine that modeling results may be improved in relation to the target textual dataset if a certain type of model or a certain model setting is used. One example of a process for making such determinations is shown in FIG. 19, which is further described below. Other examples may involve more operations, fewer operations, different operations, or a different order of the operations than is shown in FIG. 19.

In block 1902, the processor applies a set of rules, which may be predefined. For example, the processor can apply the set of rules to one or more metrics in a text profile for the target textual dataset. Additionally or alternatively, the processor can apply the set of rules to the similarity value representing the similarity between the target textual dataset and the reference textual dataset. Additionally or alternatively, the processor can apply the set of rules to a predicted level of model degradation. The processor can apply the set of rules to any one or more of the above to determine recommendations for the type of model or the model settings to apply to the target dataset.

In block 1904, the processor determines a recommended type of model to apply to the target textual dataset based on the outcome of applying the set of rules. In one example, the processor can apply a set of rules to a similarity value generated by comparing the second set of metrics of the target textual dataset to the first set of metrics of the reference textual dataset. The set of rules can include a threshold level for the similarity value. The processor can determine whether the similarity value is below to the threshold. If the similarity value is below the threshold level, is may for example mean the target textual dataset does not have at least a certain level of similarity with respect to the reference textual dataset. So, the processor can determine that another type of model may perform better on the target textual dataset than the model chosen by the user.

In another example, the processor can apply the set of rules to a predicted level of model degradation generated using the techniques described above. For example, the processor can determine whether the predicted level of model degradation exceeds a threshold level. If the predicted level of model degradation exceeds the threshold, it may for example mean that the target textual dataset is at risk for low model accuracy. So, the processor can determine that another type of model may perform better on the target textual dataset than the model chosen by the user.

The processor can determine which type of model to recommend for a given scenario using a selection process, through which the processor can select a model type to recommend from among a set of candidate model types. For example, the processor can determine a set of similarity values for a set of metrics or metric categories (e.g., information complexity, vocabulary diversity, information density, language formality, domain specificity). The similarity values may be determined by comparing the first set of metrics and the second set of metrics. After computing the similarity values, the processor then can determine which metric or metric category has the highest similarity value. Using a predefined lookup table that maps metrics or metric categories to models (e.g., model types), the processor can determine which model corresponds to the metric or metric category. The identified model may be known to perform well in relation to that metric or metric category. In this way, the processor can determine a recommended model that may yield better results than the model selected by the user.

For example, the reference textual dataset can include medical research documents. After computing similarity values for each metric category between the reference textual dataset and the target textual dataset, the two highest similarity values can be identified by the processor. The two highest similarity values may correspond to the metric categories of language formality and domain specificity. Using the lookup table, the processor can determine a recommended type of model that functions well in a specific domain and with the applicable level of language formality.

In another example, the processor can determine a predicted level of model degradation separately in relation to each metric or metric category. After determining the predicted level of model degradation for each metric or metric category, the processor then can determine which metric or metric category has the lowest predicted level of model degradation. The processor can then select a recommended type of model that is related (e.g., in a lookup table) to the determined metric or metric category. For example, the reference textual dataset can include medical research documents. After computing a predicted level of model degradation for each metric category between the reference textual dataset and the target textual dataset, the two of the predicted levels of model degradation with the highest values can be identified by the processor. These two predicted levels of model degradation may correspond to the metric categories of language formality and domain specificity. Using the lookup table, the processor can determine a recommended type of model that is more generically applicable and less affected by language formality and domain specificity.

In some examples, the processor can determine a recommended type of model to apply to the target textual dataset based on the second set of metrics computed for the target textual dataset. Since some models (e.g., specific models or model types) may function better or worse based on the textual characteristics of the target textual dataset, and the textual characteristics can be represented by the second set of metrics, the second set of metrics can serve as a useful basis for selecting a model that will function well on the target textual dataset. In some such examples, the processor can access a predefined lookup table that correlates certain metric values to certain models to determine which model to recommend to the user. In situations where the metric values are correlated in the lookup table to multiple different models, the metric values can be prioritized (e.g., depending on how influential they are on modeling results), so that the model that is correlated to the metric with the highest priority can be selected.

In block 1906, the processor outputs the recommended type of model in a graphical user interface. The user may then be able to select the recommended type of model via the graphical user interface to apply the model to the target textual dataset.

In some examples, the system can determine a recommended type of model to apply to the target textual dataset by applying a set of rules. If the recommended type of model is different from a model type selected by the user, the system can output a recommendation to the user to select the recommended model type to improve modeling results. The user may then choose the recommended model type (e.g., from a list) using the graphical user interface and apply the chosen model type to the target textual data.

In block 1908, the processor can determine a recommended value for a setting of the model type based on the outcome of applying the set of rules. In some examples, the recommended setting value can be a recommended hyperparameter value for the model type. The processor can determine the recommended value for the setting using similar techniques as described above.

In one example, the processor can apply a set of rules to a similarity value generated by comparing the second set of metrics of the target textual dataset to the first set of metrics of the reference textual dataset. The set of rules can include a threshold level for the similarity value. The processor can determine whether the similarity value is below to the threshold. If the similarity value is below the threshold level, is may for example mean the target textual dataset does not have at least a certain level of similarity with respect to the reference textual dataset. So, the processor can determine that another model setting may improve modeling results.

In another example, the processor can apply the set of rules to a predicted level of model degradation generated using the techniques described above. For example, the processor can determine whether the predicted level of model degradation exceeds a threshold level. If the predicted level of model degradation exceeds the threshold, it may for example mean that the target textual dataset is at risk for low model accuracy. So, the processor can determine that another model setting may improve modeling results.

The processor can determine which model setting to recommend for a given scenario using a selection process, through which the processor can select a value for a model setting to recommend from among a set of candidate setting values. For example, the processor can determine a set of similarity values for a set of metrics or metric categories (e.g., information complexity, vocabulary diversity, information density, language formality, domain specificity). The similarity values may be determined by comparing the first set of metrics and the second set of metrics. After computing the similarity values, the processor then can determine which metric or metric category has the highest similarity value. Using a predefined lookup table that maps metrics or metric categories to setting values, the processor can determine which setting value corresponds to the metric or metric category. The identified setting value may be known to produce good modeling results in relation to that metric or metric category. In this way, the processor can determine a recommended setting value that may improve modeling results (e.g., as compared to an existing setting value or another baseline).

For example, the reference textual dataset can include medical research documents. After computing similarity values for each metric category between the reference textual dataset and the target textual dataset, the two highest similarity values can be identified by the processor. The two highest similarity values may correspond to the metric categories of language formality and domain specificity. Using the lookup table, the processor can determine recommended values of one or more settings that may improve modeling results for a specific domain and with the applicable level of language formality.

In another example, the processor can determine a predicted level of model degradation in relation to each metric or metric category. After determining the predicted level of model degradation for each metric or metric category, the processor then can determine which metric or metric category has the lowest predicted level of model degradation. The processor can then select a recommended setting value that is related (e.g., in a lookup table) to the determined metric or metric category. For example, the reference textual dataset can include medical research documents. After computing a predicted level of model degradation for each metric category between the reference textual dataset and the target textual dataset, the two of the predicted levels of model degradation with the highest values can be identified by the processor. These two predicted levels of model degradation may correspond to the metric categories of language formality and domain specificity. Using the lookup table, the processor can determine a recommended setting value that reduces the effect of language formality and domain specificity on modeling results, which can lead to improvements in model accuracy.

In some examples, the processor can determine a recommended setting value for a selected model based on the second set of metrics computed for the target textual dataset. Since some model settings yield better or worse results based on the textual characteristics of the target textual dataset, and the textual characteristics can be represented by the second set of metrics, the second set of metrics can serve as a useful basis for selecting model settings that may produce desirable results in relation to the target textual dataset. In some such examples, the processor can access a predefined lookup table that correlates certain metric values to certain setting values to determine which setting value to recommend to the user. In situations where the metric values are correlated in the lookup table to different values for the same setting, the setting values can be prioritized (e.g., depending on how influential they are on modeling results), so that the setting value that is correlated to the metric with the highest priority can be selected.

In block 1910, the processor outputs the recommended setting value in a graphical user interface. In one example, the system can apply a set of rules to determine a recommended setting value for the model selected by the user. If the recommended value for the setting is different from the existing value of the setting, the system can output a recommendation that the user update the setting to the recommended value to improve modeling results. The user may then update the setting to the recommended value using the graphical user interface and apply the model with the updated setting value to the target textual data.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system comprising:
one or more processors; and
one or more memory devices including instructions that are executable by the one or more processors for causing the one or more processors to:
analyze a reference textual dataset by applying a plurality of text-mining techniques to the reference textual dataset to generate a first text profile containing a first plurality of metrics characterizing the reference textual dataset;
analyze a target textual dataset by applying the plurality of text-mining techniques to generate a second text profile containing a second plurality of metrics characterizing the target textual dataset;
determine a similarity value representing how similar the target textual dataset is to the reference textual dataset by comparing the second text profile to the first text profile, wherein comparing the second text profile to the first text profile involves comparing at least some of the second plurality of metrics to at least some of the first plurality of metrics;
receive, through a graphical user interface and from a user, a selection of a model that is to be applied to the target textual dataset;
in response to receiving the selection, determine characteristics of the model selected by the user, wherein the characteristics include a type and at least one setting of the model;
generate one or more insights relating to an anticipated accuracy of the model on the target textual dataset based on the similarity value and the characteristics of the model; and
output the one or more insights to the user in the graphical user interface.

2. The system of claim 1, wherein the one or more insights include a predicted level of degradation in model accuracy as a result of differences between the reference textual dataset and the target textual dataset, wherein the reference textual dataset is training data used to train the model, wherein the target textual dataset is new data not used to train the model, and wherein the one or more memory devices further include instructions that are executable by the one or more processors for causing the one or more processors to determine the predicted level of degradation based on differences between the first plurality of metrics and the second plurality of metrics.

3. The system of claim 2, wherein the predicted level of degradation corresponds to a predicted amount of loss by the model.

4. The system of claim 1, wherein the one or more insights include a recommended value for a setting of the model, and wherein the one or more memory devices further include instructions that are executable by the one or more processors for causing the one or more processors to determine the recommended value by applying a set of rules to the second plurality of metrics in the second text profile of the target textual dataset, the recommended value of the setting being configured to improve accuracy of the model as compared to another value of the setting.

5. The system of claim 4, wherein the setting is a hyperparameter.

6. The system of claim 1, wherein the one or more insights include a recommended type of model to apply to the target textual dataset, the recommended type of model being different from a model type selected by the user, and wherein the one or more memory devices further include instructions that are executable by the one or more processors for causing the one or more processors to determine the recommended type of model from among a plurality of candidate model types by applying a set of rules to the second plurality of metrics in the second text profile of the target textual dataset, the recommended type of model being capable of achieving a higher degree of accuracy in relation to the target textual dataset than the model type selected by the user.

7. The system of claim 6, wherein the plurality of candidate model types include a recurrent neural network, a convolutional neural network, a long-short term memory model, a regression model, and a support vector machine.

8. The system of claim 1, wherein the second plurality of metrics includes at least two metrics selected from a group consisting of: a total number of function words, a percentage of uppercase letters to lowercase letters, a number of sentences in a longest document by sentence count, an average number of tokens per sentence, a number of tokens in a longest sentence by token count, a total number of unique words, an average number of characters per token, a number of characters or bytes in a longest token, a number of unique tokens, a number of unique tokens to account for 80% of the target textual dataset, a percentage of tokens that are content, a percentage of tokens that are a number, and a percentage of tokens that are punctuations.

9. The system of claim 1, wherein the one or more memory devices further include instructions that are executable by the one or more processors for causing the one or more processors to determine a data-preparation recommendation by analyzing the target textual dataset, wherein the data-preparation recommendation indicates whether the target textual dataset should be preprocessed using one or more data-preparation operations before the model is applied to the target textual dataset.

10. The system of claim 9, wherein the one or more memory devices further include instructions that are executable by the one or more processors for causing the one or more processors to determine the data-preparation recommendation by analyzing sentence lengths in the target textual dataset, word spellings in the target textual dataset, and lengths of documents in the target textual dataset.

11. The system of claim 9, wherein the one or more data-preparation operations include normalizing the target textual dataset, removing a subpart of the target textual dataset, or reformatting the target textual dataset from a first format into a second format.

12. The system of claim 1, wherein the one or more memory devices further include instructions that are executable by the one or more processors for causing the one or more processors to:
segment the target textual dataset into a plurality of subparts based on a stratification parameter;
analyze the subparts to determine whether the target textual dataset satisfies a homogeneity criterion; and
in response to determining that the target textual dataset does not satisfy the homogeneity criterion, generate a recommendation in the graphical user interface suggesting that the plurality of subparts be analyzed separately from one another using one or more models; or
in response to determining that the target textual dataset satisfies the homogeneity criterion, generate another recommendation in the graphical user interface suggesting that the target textual dataset be analyzed as a whole using the model.

13. The system of claim 1, wherein the model is a first model and the selection is a first selection, and wherein the one or more memory devices further include instructions that are executable by the one or more processors for causing the one or more processors to, subsequent to outputting the one or more insights to the user in the graphical user interface:
receive, through the graphical user interface and from the user, a second selection of a second model to be applied to the target textual dataset, the second model being different from the first model selected by the user; and
execute the second model on the target textual dataset to generate an analysis result; and
output the analysis result in the graphical user interface for the user.

14. The system of claim 1, wherein the plurality of text-mining techniques are configured to analyze information complexity, vocabulary diversity, information density, language formality, and domain specificity of a corresponding dataset to which they are applied.

15. The system of claim 14, wherein the plurality of text-mining techniques are configured to analyze the corresponding dataset using natural-language processing.

16. The system of claim 14, wherein a text-mining technique in the plurality of text-mining techniques is configured to determine the domain specificity of the corresponding dataset by:
determining a frequency of a set of words in the corresponding dataset, wherein the set of words are representative of a specific textual domain;
determining a total number of words in the corresponding dataset; and
determining a ratio of (i) the frequency of the set of words to (ii) the total number of words; and
determining the domain specificity based on the ratio.

17. The system of claim 1, wherein the similarity value is expressed as a quantitative value, and wherein the one or more memory devices further include instructions that are executable by the one or more processors for causing the one or more processors to:
compute at least one difference between (i) at least one metric of the first plurality of metrics and (ii) at least one corresponding metric of the second plurality of metrics; and
determine the quantitative value based on the at least one difference.

18. The system of claim 1, wherein the reference textual dataset is configured to represent a particular textual domain, genre, or language for purposes of comparison to the target textual dataset.

19. The system of claim 1, wherein the one or more memory devices further include instructions that are executable by the one or more processors for causing the one or more processors to output the one or more insights as a sentence of words generated using natural-language generation techniques.

20. The system of claim 1, wherein the reference textual dataset includes first unstructured text, and wherein the target textual dataset includes second unstructured text that is different from the first unstructured text.

21. A method comprising:
  analyzing, by one or more processors, a reference textual dataset by applying a plurality of text-mining techniques to the reference textual dataset to generate a first text profile containing a first plurality of metrics characterizing the reference textual dataset;
  analyzing, by the one or more processors, a target textual dataset by applying the plurality of text-mining techniques to generate a second text profile containing a second plurality of metrics characterizing the target textual dataset;
  determining, by the one or more processors, a similarity value representing how similar the target textual dataset is to the reference textual dataset by comparing the second text profile to the first text profile, wherein comparing the second text profile to the first text profile involves comparing at least some of the second plurality of metrics to at least some of the first plurality of metrics;
  receiving, by the one or more processors, a selection of a model that is to be applied to the target textual dataset, the selection being received through a graphical user interface from a user;
  in response to receiving the selection, determining, by the one or more processors, characteristics of the model selected by the user, wherein the characteristics include a type and at least one setting of the model;
  generating, by the one or more processors, one or more insights relating to an anticipated accuracy of the model on the target textual dataset based on the similarity value and the characteristics of the model; and
  outputting, by the one or more processors, the one or more insights to the user in the graphical user interface.

22. The method of claim 21, wherein the one or more insights include a predicted level of degradation in model accuracy as a result of differences between the reference textual dataset and the target textual dataset, wherein the reference textual dataset is training data used to train the model, wherein the target textual dataset is new data not used to train the model, and further comprising determining the predicted level of degradation based on differences between the first plurality of metrics and the second plurality of metrics.

23. The method of claim 21, wherein the one or more insights include a recommended value for a setting of the model, and further comprising determining the recommended value by applying a set of rules to the second plurality of metrics in the second text profile of the target textual dataset, the recommended value of the setting being configured to improve accuracy of the model as compared to another value of the setting.

24. The method of claim 21, wherein the one or more insights include a recommended type of model to apply to the target textual dataset, the recommended type of model being different from a model type selected by the user, and further comprising determining the recommended type of model from among a plurality of candidate model types by applying a set of rules to the second plurality of metrics in the second text profile of the target textual dataset, the recommended type of model being capable of achieving a higher degree of accuracy in relation to the target textual dataset than the model type selected by the user.

25. The method of claim 21, further comprising determining a data-preparation recommendation by analyzing the target textual dataset, wherein the data-preparation recommendation indicates whether the target textual dataset should be preprocessed using one or more data-preparation operations before the model is applied to the target textual dataset.

26. The method of claim 21, further comprising:
  segmenting the target textual dataset into a plurality of subparts based on a stratification parameter;
  analyzing the subparts to determine whether the target textual dataset satisfies a homogeneity criterion; and
  in response to determining that the target textual dataset does not satisfy the homogeneity criterion, generating a recommendation in the graphical user interface suggesting that the plurality of subparts be analyzed separately from one another using one or more models; or
  in response to determining that the target textual dataset satisfies the homogeneity criterion, generating another recommendation in the graphical user interface suggesting that the target textual dataset be analyzed as a whole using the model.

27. The method of claim 21, wherein the plurality of text-mining techniques are configured to analyze information complexity, vocabulary diversity, information density, language formality, and domain specificity of a corresponding dataset to which they are applied.

28. The method of claim 21, wherein a text-mining technique in the plurality of text-mining techniques is configured to determine domain specificity of a corresponding dataset by:
  determining a frequency of a set of words in the corresponding dataset, wherein the set of words are representative of a specific textual domain;
  determining a total number of words in the corresponding dataset; and
  determining a ratio of (i) the frequency of the set of words to (ii) the total number of words; and
  determining the domain specificity based on the ratio.

29. The method of claim 21, wherein the similarity value is expressed as a quantitative value, and further comprising:
  computing at least one difference between (i) at least one metric of the first plurality of metrics and (ii) at least one corresponding metric of the second plurality of metrics; and
  determining the quantitative value based on the at least one difference.

30. A non-transitory computer-readable medium comprising program code that is executable by one or more processors for causing the one or more processors to:
  analyze a reference textual dataset by applying a plurality of text-mining techniques to the reference textual dataset to generate a first text profile containing a first plurality of metrics characterizing the reference textual dataset;
  analyze a target textual dataset by applying the plurality of text-mining techniques to generate a second text profile containing a second plurality of metrics characterizing the target textual dataset;
  determine a similarity value representing how similar the target textual dataset is to the reference textual dataset by comparing the second text profile to the first text profile, wherein comparing the second text profile to the first text profile involves comparing at least some of the second plurality of metrics to at least some of the first plurality of metrics;
  receive, through a graphical user interface and from a user, a selection of a model that is to be applied to the target textual dataset;

in response to receiving the selection, determine characteristics of the model selected by the user, wherein the characteristics include a type and at least one setting of the model;

generate one or more insights relating to an anticipated accuracy of the model on the target textual dataset based on the similarity value and the characteristics of the model; and output the one or more insights to the user in the graphical user interface.

* * * * *